(12) United States Patent
Lee et al.

(10) Patent No.: US 9,831,719 B2
(45) Date of Patent: Nov. 28, 2017

(54) APPARATUS AND METHOD FOR TRANSMITTING WIRELESS POWER

(71) Applicant: INTELLECTUAL DISCOVERY CO., LTD., Seoul (KR)

(72) Inventors: Kang Yoon Lee, Seoul (KR); Hyung Gu Park, Seoul (KR); Jae Hyeong Jang, Seoul (KR); Ji Hun Kang, Anyang-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 860 days.

(21) Appl. No.: 14/264,833

(22) Filed: Apr. 29, 2014

(65) Prior Publication Data
US 2014/0319923 A1 Oct. 30, 2014

(30) Foreign Application Priority Data
Apr. 30, 2013 (KR) ........................ 10-2013-0048878

(51) Int. Cl.
*H01F 27/42* (2006.01)
*H02J 17/00* (2006.01)
*H02J 5/00* (2016.01)

(52) U.S. Cl.
CPC .............. *H02J 17/00* (2013.01); *H02J 5/005* (2013.01)

(58) Field of Classification Search
CPC ........... H04R 3/005; H03H 7/40; H04L 67/12
See application file for complete search history.

(56) References Cited

U.S. PATENT DOCUMENTS

| | | | |
|---|---|---|---|
| 6,894,529 B1 * | 5/2005 | Chong | H03K 19/0005 326/27 |
| 8,154,901 B1 * | 4/2012 | Lee | H05K 1/0243 326/30 |
| 2002/0101278 A1 * | 8/2002 | Schultz | H03K 19/0005 327/543 |

* cited by examiner

*Primary Examiner* — Sibin Chen
(74) *Attorney, Agent, or Firm* — NSIP Law

(57) ABSTRACT

The present invention relates to an apparatus and a method for transmitting wireless power, and more particularly, to an apparatus and a method for transmitting wireless power that rapidly and precisely adjusts impedance so as to transmit desired power. Disclosed an apparatus for transmitting wireless power that performs wireless power transmission, including: an oscillator; an amplifier; an impedance matcher including a matching network which adjusts impedance according to a digital control signal and an analog signal, a sensor, a digital controller which outputs a digital control signal, and generates an analog control start signal when adjustment of the impedance by the digital control signal is completed, and an analog controller which outputs the analog control signal, and a transmitting antenna which radiates the magnetic field by using the transmission power.

23 Claims, 18 Drawing Sheets

APPARATUS AND METHOD FOR TRANSMITTING WIRELESS POWER

This application claims the benefit of priority of Korean Patent Application No. 10-2013-0048878 filed on Apr. 30, 2013, which is incorporated by reference in its entirety herein.

BACKGROUND OF THE INVENTION

Field of the Invention

The present invention relates to an apparatus and a method for transmitting wireless power, and more particularly, to an apparatus and a method for transmitting wireless power that rapidly and precisely adjusts impedance so as to transmit desired power.

Discussion of the Related Art

A wireless power transmission technology is a technology that wirelessly transmits power between a power source and an electronic apparatus. As one example, the wireless power transmission technology can wirelessly charge a battery of a mobile terminal just by putting a mobile terminal such as a smart phone or a tablet on a wireless charging pad to provide higher mobility, convenience, and safety than a wired charging environment using the existing wired charging connector. Further, the wireless power transmission technology attracts public attention to substitute the existing wired power transmission environment in various fields such as medical treatment, leisure, a robot, and the like, which include home appliances and an electric vehicle afterwards in addition to wireless charging of the mobile terminal.

The wireless power transmission technology may be classified into a technology using electromagnetic wave radiation and a technology using an electromagnetic induction phenomenon, and since the technology using the electromagnetic wave radiation has a limit of efficiency depending on radiation loss consumed in the air, the technology using the electromagnetic induction phenomenon has been primarily researched in recent years.

The wireless power transmission technology using the electromagnetic induction phenomenon is generally classified into an inductive coupling scheme and a resonant magnetic coupling scheme.

The electromagnetic inductive coupling scheme is a scheme that transmits energy by using current induced to a coil at a receiving side due to a magnetic field generated at a coil at a transmitting side according to electromagnetic coupling between the coil at the transmitting side and the coil at the receiving side. The wireless power transmission technology of the electromagnetic inductive coupling scheme has an advantage that transmission efficiency is high, but has a disadvantage that a power transmission distance is limited to several mms and is very sensitive to matching of the coils, and as a result, a degree of positional freedom is remarkably low.

The resonant magnetic coupling scheme as a technology proposed by Professor Marine Solarbeach of MIT in 2005 is a scheme that transmits energy by using a phenomenon in which the magnetic field concentrates on both sides of the transmitting side and the receiving side by the magnetic field applied at a resonance frequency between the coil at the transmitting side and the coil at the receiving side. As a result, the resonant magnetic coupling scheme is expected as the wireless power transmission technology that can transmit energy up to a comparatively long distance from several cms to several ms as compared with the magnetic inductive coupling scheme to implement authentic cord-free.

However, when wireless power transmission is performed, impedances at the transmitting side and the receiving side may vary depending on a transmission distance or state changes at the transmitting side and the receiving side. In this case, in general, matching the impedance by detecting a reflection wave has a problem that it is difficult to match the impedance rapidly and precisely because a response speed is low and a range of matching the impedance is small.

SUMMARY OF THE INVENTION

An object of the present invention is to provide an apparatus and a method for transmitting wireless power that matches power impedance rapidly and precisely based on a characteristic of transmission power.

Objects to be solved by the present invention are not limited to the aforementioned objects and unmentioned objects will be clearly understood by those skilled in the art from the specification and the appended claims.

In accordance with an aspect of the present invention, there is provided an apparatus for transmitting wireless power that performs wireless power transmission by using a magnetic field, including: an oscillator which oscillates power having a specific frequency; an amplifier which outputs transmission power by amplifying the power having the specific frequency; an impedance matcher including a matching network which adjusts impedance according to a digital control signal and an analog signal, a sensor which senses a voltage value or a current value of the transmission power, a digital controller which compares a sensing result by the sensor to a magnitude of a reference value, outputs the digital control signal according to the comparison result, and generates an analog control start signal when adjustment of the impedance by the digital control signal is completed, and an analog controller which is activated by the analog control start signal and outputs the analog control signal based on a difference between the sensing result by the sensor and the reference value; and a transmitting antenna which radiates the magnetic field by using the transmission power.

In accordance with another aspect of the present invention, there is provided a method for transmitting wireless power by using a magnetic field, including: oscillating power having a specific frequency; outputting transmission power by amplifying the power having the specific frequency; sensing, by a sensor, a voltage value or a current value of the transmission power; comparing, by a digital controller, a sensing result by the sensor and a magnitude of a reference value and outputting a digital control signal according to the comparison result; adjusting impedance according to the digital control signal; generating, by the digital controller, an analog control start signal when the adjustment of the impedance by the digital control signal is completed; outputting, by an analog controller, an analog control signal based on a difference between the sensing result by the sensor and the reference value when receiving the analog control start signal; adjusting the impedance according to the analog control signal; and radiating the magnetic field by using the transmission power.

Solving means of objects of the present invention is not limited to the aforementioned solving means and unmentioned solving means will be clearly understood by those skilled in the art from the specification and the appended claims.

According to the present invention, a digital control is rapidly performed primarily in matching the impedance based on a power characteristic of transmission power and a precise analog control is secondarily performed to rapidly and accurately match the impedance.

Effects of the present invention are not limited to the aforementioned effects and unmentioned effects will be clearly understood by those skilled in the art from the specification and the appended claims.

DETAILED DESCRIPTION OF THE EMBODIMENTS

Figure 1:
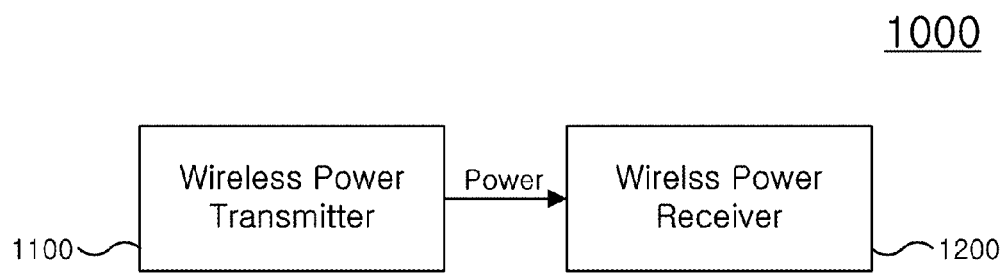
FIG. 1 is a block diagram of a wireless power transmission system according to an exemplary embodiment of the present invention.

Since exemplary embodiments disclosed in the specification are used to clearly describe the spirit of the present invention for those skilled in the art, the present invention is not limited to the exemplary embodiments disclosed in the specification and it should be analyzed that the scope of the present invention includes a modified example and a transformed example without departing from the spirit of the present invention.

Terms and the accompanying drawings used in the specification are used to easily describe the present invention and shapes illustrated in the drawings may be enlarged as necessary for help understanding the present invention, and as a result, the present invention is not limited by the terms and the drawings used in the specification.

When it is determined that a detailed description of a known configuration or function associated with the present invention obscures the spirit of the present invention, the detailed description thereof will be omitted as necessary.

In accordance with an aspect of the present invention, there is provided an apparatus for transmitting wireless power that performs wireless power transmission by using a magnetic field, including: an oscillator which oscillates power having a specific frequency; an amplifier which outputs transmission power by amplifying the power having the specific frequency; an impedance matcher including a matching network which adjusts impedance according to a digital control signal and an analog signal, a sensor which senses a voltage value or a current value of the transmission power, a digital controller which compares a sensing result by the sensor to a magnitude of a reference value, outputs the digital control signal according to the comparison result, and generates an analog control start signal when adjustment of the impedance by the digital control signal is completed, and an analog controller which is activated by the analog control start signal and outputs the analog control signal based on a difference between the sensing result by the sensor and the reference value; and a transmitting antenna which radiates the magnetic field by using the transmission power.

The apparatus may further include a communication unit which communicates with a wireless power receiving apparatus that performs wireless power reception by using the magnetic field; and a controller which receives the reference value from the wireless power receiving apparatus through the communication unit.

The apparatus may further include a communication unit which communicates with a plurality of wireless power receiving apparatuses that performs the wireless power reception by using the magnetic field; and a controller which receives a plurality of target values from the plurality of wireless power receiving apparatuses through the communication unit, respectively and calculates the reference value based on the plurality of target values.

The apparatus may further include a communication unit which communicates with the wireless power receiving apparatus that performs the wireless power reception by using the magnetic field; and a controller which receives a device profile from the wireless power receiving apparatus through the communication unit and determines the reference value based on the device profile.

The digital controller may generate the analog control start signal when the difference between the sensing result and the reference value is equal to or less than a predetermined value.

The digital controller may repeatedly output the digital control signal and generate the analog control start signal when the number of output times of the digital control signal reaches a predetermined number of times.

The digital controller may output an on/off signal according to the sensing result being equal to or more than or equal to or less than the reference value.

The matching network may include a plurality of fixed capacitors which are connected to each other in parallel, a plurality of switches which are connected to the plurality of fixed capacitors, respectively and control connection states of the plurality of capacitors according to the digital control signal, and a variable capacitor of which capacitance is changed according to the analog control signal.

The digital controller may repeatedly output the digital control signals at the number of times corresponding to the number of the plurality of switches, the plurality of switches may be sequentially turned on/off according to the digital control signal, and the digital controller may output the analog control start signal when the output of the digital control signal is repeated at the number of times corresponding to the number of the plurality of switches.

The variable capacitor may include a varactor of which capacitance is adjusted according to a level of the analog control signal.

The amplifier may include an amplifying circuit of which an amplification ratio is adjusted according to the digital control signal and the analog control signal.

The amplifying circuit may include a DA converter which outputs an analog signal according to the digital control signal, a first MOS which has a gate connected to an output terminal of the DA converter, and adjusts the amplification ratio according to the analog signal, and a second MOS which has a gate connected to an output terminal of the analog controller and adjusts the amplification ratio according to the analog control signal.

In accordance with another aspect of the present invention, there is provided a method for transmitting wireless power by using a magnetic field, including: oscillating power having a specific frequency; outputting transmission power by amplifying the power having the specific frequency; sensing, by a sensor, a voltage value or a current value of the transmission power; comparing, by a digital controller, a sensing result by the sensor and a magnitude of a reference value and outputting a digital control signal according to the comparison result; adjusting impedance according to the digital control signal; generating, by the digital controller, an analog control start signal when the adjustment of the impedance by the digital control signal is completed; outputting, by an analog controller, an analog control signal based on a difference between the sensing result by the sensor and the reference value when receiving the analog control start signal; adjusting the impedance according to the analog control signal; and radiating the magnetic field by using the transmission power.

The method may further include receiving the reference value from a wireless power receiving apparatus that performs wireless power reception by using the magnetic field.

The method may further include: receiving a plurality of target values from a plurality of wireless power receiving apparatuses that perform the wireless power reception by using the magnetic field, respectively; and calculating the reference value based on the plurality of target values.

The method may further include receiving a device profile from the wireless power receiving apparatus that performs the wireless power reception by using the magnetic field; and judging the reference value based on the device profile.

In the generating of the analog control start signal, the analog control start signal may be generated when the difference between the sensing result and the reference value is equal to or less than a predetermined value.

The outputting of the digital control signal may be repeatedly performed, and in the generating of the analog control start signal, the analog control start signal may be generated when the number of output times of the digital control signal reaches a predetermined number of times.

In the outputting of the digital control signal, an on/off signal may be output according to the sensing result being equal to or more than or equal to or less than the reference value.

The adjusting of the impedance according to the digital control signal may include adjusting the impedance as connection states of a plurality of fixed capacitors connected to each other in parallel are adjusted according to the digital control signal, and the adjusting of the impedance according to the analog control signal may include adjusting capacitance of a variable capacitor according to the analog control signal.

The variable capacitor may include a varactor of which capacitance is adjusted according to a level of the analog control signal.

The outputting of the transmission power may include adjusting an amplification ratio of the transmission power according to the digital control signal and the analog control signal.

The adjusting of the amplification ratio may include outputting, by a DA converter, an analog signal according to the digital control signal, adjusting, by a first MOS having a gate connected to an output terminal of the DA converter, the amplification ratio according to the analog signal, and adjusting, by a second MOS receiving the analog control signal through a gate, the amplification ratio according to the analog control signal.

Hereinafter, a wireless power transmission system 1000 according to an exemplary embodiment of the present invention will be described.

The wireless power transmission system 1000 may transmit power wirelessly using a magnetic field.

FIG. 1 is a block diagram of the wireless power transmission system 1000 according to an exemplary embodiment of the present invention.

Referring to FIG. 1, the wireless power transmission system 1000 includes a wireless power transmitting apparatus 1100 and a wireless power receiving apparatus 1200. The wireless power transmitting apparatus 1100 receives power from an external power source S to generate the magnetic field. The wireless power receiving apparatus 1200 generates current by using the generated magnetic field to receive power wirelessly.

Herein, the wireless power transmitting apparatus 1100 may be provided as a fixed type or a movable type. An example of the fixed type includes a type which is embedded in a ceiling or a wall surface or a furniture such as a table, or the like indoor, a type which is installed in an outdoor parking lot, a bus stop, or a subway station as an implant type, or a type which is installed in transporting means such as a vehicle or a train. The movable wireless power transmitting apparatus 1100 may be implemented as a part of a movable apparatus having a movable weight or size or other apparatus such as a cover of a notebook computer, or the like.

Further, the wireless power receiving apparatus 1200 should be analyzed as a comprehensive concept including various electronic apparatuses including a battery and various home appliances driven by receiving power wirelessly instead of a power cable. Representative examples of the wireless power receiving apparatus 1200 include a portable terminal, a cellular phone, a smart phone, a personal digital assistant (PDA), a portable media player (PMP), a Wibro terminal, a tablet, a pablet, a notebook, a digital camera, a navigation terminal, a television, an electric vehicle (EV), and the like. In addition, the wireless power receiving apparatus 1200 may be provided to be attached to/detached from the electronic apparatus and a representative example of the wireless power receiving apparatus includes a battery cover or a protection case of a smart phone.

One or more wireless power receiving apparatuses 1200 may be present in the wireless power transmitting system 1000. In FIG. 1, it is expressed that the wireless power transmitting apparatus 1100 and the wireless power receiving apparatus 1200 transmit and receive power one to one, but one wireless power transmitting apparatus 1100 may transmit power to the plurality of wireless power receiving apparatuses 1200. In particular, when the wireless power transmission is performed in the resonant magnetic coupling scheme, one wireless power transmitting apparatus 1100 may transmit power to a plurality of wireless power receiving apparatuses 1200 simultaneously by applying a simultaneous transmission scheme or a time division transmission scheme.

Meanwhile, although not illustrated in FIG. 1, the wireless power transmitting system 1000 may further include a relay for increasing a power transmission distance. As the relay, a passive type resonance loop implemented by an LC circuit may be used. The resonance loop may increase the wireless power transmission distance by focusing a magnetic field radiated to the atmosphere. It is possible to secure wider wireless power transmission coverage by simultaneously using a plurality of relays.

Hereinafter, the wireless power transmitting apparatus 1100 according to the exemplary embodiment of the present invention will be described.

The wireless power transmitting apparatus 1100 may transmit power wirelessly.

Figure 2:
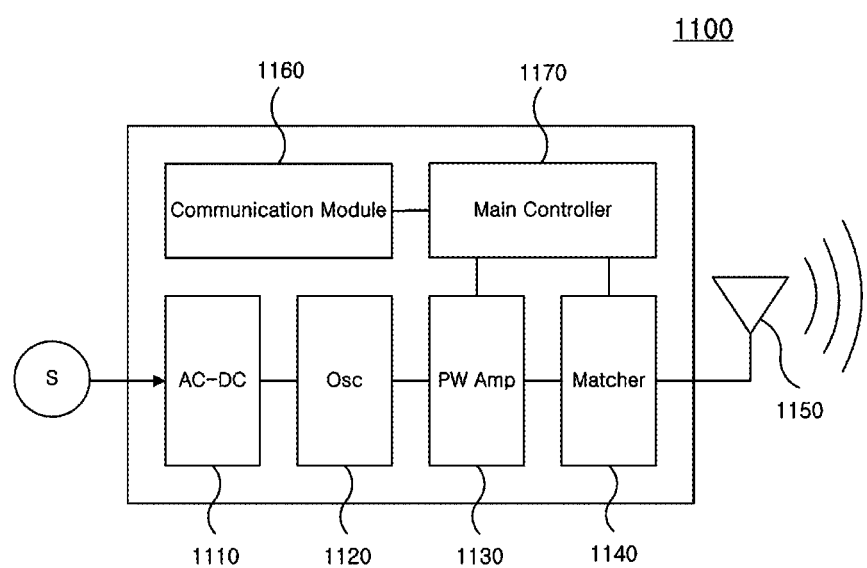
FIG. 2 is a block diagram of an apparatus for transmitting wireless power according to an exemplary embodiment of the present invention.

FIG. 2 is a block diagram of the wireless power transmitting apparatus 1100 according to an exemplary embodiment of the present invention.

Referring to FIG. 2, the wireless power transmitting apparatus 1100 may include an AC-DC converter 1110, an oscillator 1120, an amplifier 1130, an impedance matcher 1140, a transmission antenna 1150, a communication unit 1160, and a control unit 1170.

The AC-DC converter 1110 may convert AC power into DC power. The AC-DC converter 1110 receives the AC power from the external power source S and converts a wavelength of the received AC power into the DC power and outputs the DC power. The AC-DC converter 1110 may adjust a voltage value of the output DC power.

The oscillator 1120 may convert the DC power into AC power having a desired specific frequency. The oscillator 1120 receives the DC power output by the AC-DC converter 1110 and converts the received DC power into AC power having a specific frequency and outputs the AC power. Herein, the specific frequency may be a resonance frequency. In this case, the oscillator 1120 may output the AC power having the resonance frequency.

The amplifier 1130 may amplify voltage or current of power. The amplifier 1130 receives the AC power having the specific frequency, which is output by the oscillator 1120, and amplifies voltage or current of the received AC power having the specific frequency and outputs the amplified voltage or current.

Herein, the amplifier 1130 may adjust an amplification ratio of the output power to the input power. For example, the amplifier 1130 may sense a power characteristic of the output power and adjust the amplification ratio according to the power characteristic. The amplifier 1130 will be described below in detail. Herein, the power characteristic will be described below.

The impedance matcher 1140 may perform impedance matching. The impedance matcher 1140 may include a capacitor, an inductor, and a switching element that switches a connection thereof. The impedance matching may be performed by adjusting a connection state of the capacitor or the inductor by switching the switching element, or adjusting capacitance of the capacitor or inductance of the inductor.

Herein, the impedance matcher 1140 may be adjusted based on a power characteristic of wireless power transmitted through the transmission antenna 1150. The impedance matcher 1140 will be described below in detail.

The transmission antenna 1150 may transmit power wirelessly. The transmission antenna 1150 may general an electromagnetic field by using the AC power. The transmission antenna 1150 receives the AC power having the specific frequency, which is output by the amplifier 1130 to thereby generate a magnetic field having a specific frequency. The magnetic field radiated from the transmission antenna 1150 is transferred to a receiving antenna 1210 of the wireless power receiving apparatus 1200 and the receiving antenna 1210 generates current by using the magnetic field to transfer power.

The communication unit 1160 may transmit/receive information to/from the wireless power receiving apparatus 1200. The communication unit 1160 may be provided as a short-range communication module. For example, the communication unit 1160 may be a module that performs a communication according to short-range communication protocols including Wi-Fi, Bluetooth, Bluetooth LE, ZigBee, NFC, and the like.

The communication unit 1160 may receive a device profile or a desired power characteristic of the wireless power receiving apparatus 1200 from the wireless power receiving apparatus 1200. Herein, the device profile may mean information for identifying the wireless power receiving apparatus 1200.

The main controller 1170 may control an overall operation of the wireless power transmitting apparatus 1100. The main controller 1170 may calculate and process various pieces of information and control respective components of the wireless power transmitting apparatus 1100.

The main controller 1170 may be implemented as a computer or an apparatus similar thereto by using hardware, software or a combination thereof. The main controller 1170 may be provided in a form of an electronic circuit that performs a control function by processing an electric signal in terms of the hardware and in a form of a program that drives the main controller 1157 which is the hardware in terms of the software.

Hereinafter, the wireless power receiving apparatus 1200 according to the embodiment of the present invention will be described.

The wireless power receiving apparatus 1200 may receive power wirelessly.

Figure 3:
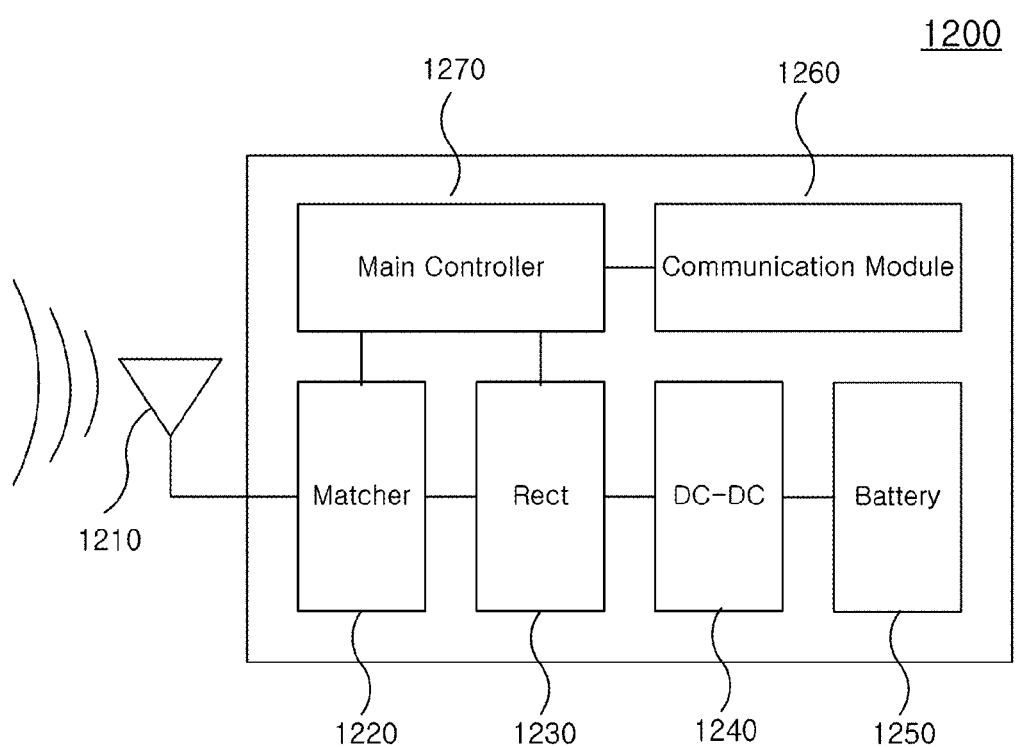
FIG. 3 is a block diagram of an apparatus for receiving wireless power according to an exemplary embodiment of the present invention.

FIG. 3 is a block diagram of the wireless power receiving apparatus 1200 according to an embodiment of the present invention.

Referring to FIG. 3, the wireless power receiving apparatus 1200 may include a receiving antenna 1210, an impedance matcher 1220, a rectifier 1230, a DC-DC converter 1240, and a battery 1250.

The receiving antenna 1210 may receive the wireless power transmitted by the wireless power transmitting apparatus 1100. Herein, when a specific frequency is the resonance frequency, a magnetic resonance phenomenon occurs between the transmitting antenna 1150 and the receiving antenna 1210, and as a result, power may be more efficiently received.

The impedance matcher 1220 may adjust the impedance of the wireless power receiving apparatus 1200. The impedance matcher 1220 may include a capacitor, an inductor, and a switching element that switches a connection thereof. Impedance matching may be performed by detecting a reflection wave of the wireless power transmitted through the receiving antenna 1210, adjusting a connection state of the capacitor or the inductor by switching the switching element based on the detected reflection wave, or adjusting capacitance of the capacitor or inductance of the inductor.

The rectifier 1230 rectifies the received wireless power to convert AC power to DC power. The rectifier 1230 may convert the AC power into the DC power by using a diode or a transistor and smooth the DC power by using the capacitor or a resistor.

The DC-DC converter 1240 converts voltage of the rectified DC power into a desired level to output the voltage having the desired level. When a voltage value of the DC power rectified by the rectifier 1230 is larger or smaller than a voltage value required to charge the battery or drive the electronic apparatus, the DC-DC converter 1240 may change the voltage value of the rectified DC power to desired voltage.

The battery 1250 may store energy by using the power output from the DC-DC converter 1240. Meanwhile, the wireless power receiving apparatus 1200 need not particularly include the battery 1250. For example, the battery may be provided as an external component which is detachable. As another example, the wireless power receiving apparatus 1200 may include driving means that drives various operations of the electronic apparatus instead of the battery 1250.

The communication unit 1260 may transmit and receive information to and from the wireless power transmitting apparatus 1100. The communication unit 1260 may be provided as the short-range communication module. For example, the communication unit 1260 may be a module that performs a communication according to the short-range communication protocols including the Wi-Fi, the Bluetooth, the Bluetooth LE, the ZigBee, the NFC, and the like.

The communication unit 1260 may receive a device profile or a desired power characteristic of the wireless power receiving apparatus 1200 by the wireless power transmitting apparatus 1100. Herein, the device profile may mean information for identifying the wireless power receiving apparatus 1200.

The main controller 1270 may control an overall operation of the wireless power receiving apparatus 1200. The main controller 1270 may calculate and process various pieces of information and control respective components of the wireless power receiving apparatus 1200.

The main controller 1270 may be implemented as the computer or the apparatus similar thereto according to the hardware, the software, or the combination thereof. The main controller 1270 may be provided in a form of an electronic circuit that performs a control function by processing an electric signal in terms of the hardware and in a form of a program that drives the main controller 1150 which is the hardware in terms of the software.

Hereinafter, a process in which the power is wirelessly transmitted in the wireless power transmitting system 1000 according an embodiment of the present invention will be described.

Wireless transmission of power may be performed by using the electromagnetic inductive coupling scheme or the resonant magnetic coupling scheme. In this case, the wireless transmission of the power may be performed between the transmitting antenna 1150 of the wireless power transmitting apparatus 1100 and the receiving antenna 1210 of the wireless power receiving apparatus 1200.

When the resonant magnetic coupling scheme is used, each of the transmitting antenna 1150 and the receiving antenna 1210 may be provided in a form of a resonance antenna. The resonance antenna may have a resonance structure including the coil and the capacitor. In this case, the resonance antenna and the resonance frequency are determined by the inductance of the coil and the capacitance of the capacitor. Herein, the coil may be formed in a form of a loop. Further, a core may be placed in the loop. The core may include a physical core such as a ferrite core or an air core.

Energy transmission between the transmitting antenna 1150 and the receiving antenna 1210 may be performed through a resonance phenomenon of the magnetic field. The resonance phenomenon means a phenomenon in which both resonance antennas are coupled to each other, and as a result, energy is transferred between the resonance antennas with high efficiency in the case where other resonance antennas are positioned around one resonance antenna when a near filed corresponding to the resonance frequency is generated in one resonance antenna. When the magnetic field corresponding to the resonance frequency is generated between the resonance antenna of the transmitting antenna 1150 and the resonance antenna of the receiving antenna 1210, the resonance phenomenon occurs, in which the resonance antennas of the transmitting antenna 1150 and the receiving antenna 1210, and as a result, in a general case, the magnetic field is focused toward the receiving antenna 1210 with higher efficiency than a case in which the magnetic field generated in the transmitting antenna 1150 is radiated to free space. Therefore, energy may be transferred from the transmitting antenna 1150 to the receiving antenna 1210 with high efficiency.

The electromagnetic inductive coupling scheme may be implemented similarly as the resonance magnetic coupling scheme, but in this case, the frequency of the magnetic field need not be the resonance frequency. Instead, in the electromagnetic inductive coupling scheme, matching the loops constituting the receiving antenna 1210 and the transmitting antenna 1150 is required and a gap between the loops needs to be very small.

Hereinafter, the amplifier 1130 according to the embodiment of the present invention will be described.

Figure 4:
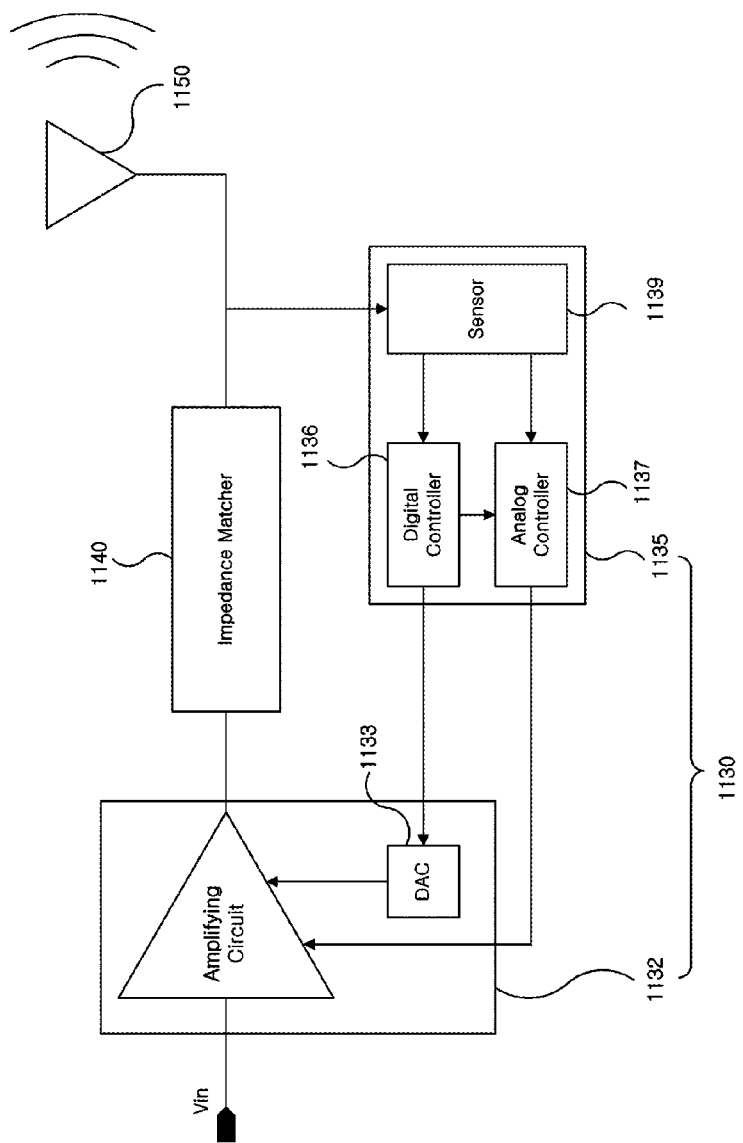
FIG. 4 is a block diagram of an amplifier according to an exemplary embodiment of the present invention.

FIG. 4 is a block diagram of the amplifier 1130 according to the embodiment of the present invention.

Referring to FIG. 4, the amplifier 1130 may include an amplifying circuit 1132 and a controller 1135.

The amplifying circuit 1132 amplifies power having a specific frequency, which is output from the oscillator 1120. In this case, an amplification ratio of power, that is, a ratio of output power to input power may be adjusted.

The controller 1135 may adjust an amplification ratio of the amplifying circuit 1132.

The controller 1135 may include a sensor 1139, a digital controller, 1136, and an analog controller 1137.

The sensor 1139 senses power output from the amplifier 1130. Herein, the output power may correspond to transmission power applied to the transmitting antenna 1150. The sensor 1139 may measure a power characteristic of the transmission power, that is, a voltage value or a current value.

The digital controller 1136 may generate a digital control signal based on the power characteristic of the transmission power. The digital control signal may be an on/off signal of at least 1 bit or more. Thereafter, the digital control signal may be converted into an analog signal in a DA converter 1133, and as a result, the amplification ratio of the amplifying circuit 1130 may be digitally controlled.

Further, the digital controller 1136 may generate an analog control start signal for activating the analog controller 1137 when the digital control of the amplification ratio of the amplifying circuit 1130 is completed.

The analog controller 1135 receives the analog control start signal to be activated by the received analog control start signal. The analog controller 1137 may generate an analog control signal based on the power characteristic of the transmission power. As a result, the amplification ratio of the amplifying circuit 1130 may be analoguely controlled.

Hereinafter, the impedance matcher 1140 according to the embodiment of the present invention will be described.

Figure 5:
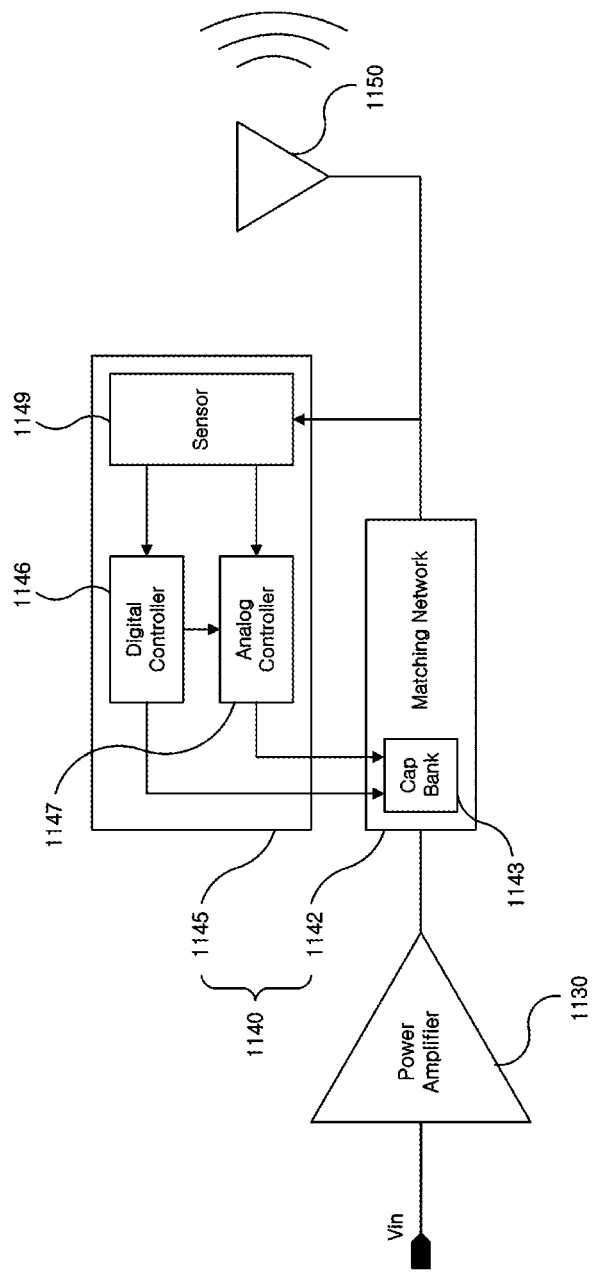
FIG. 5 is a block diagram of an impedance matcher according to an exemplary embodiment of the present invention.

FIG. 5 is a block diagram of the impedance matcher 1140 according to the embodiment of the present invention.

Referring to FIG. 5, the impedance matcher 1140 may include a matching network 1142 and a controller 1145.

The matching network 1142 may match the impedance of the wireless power transmitting apparatus 1100. The matching network 1142 may include a cap. bank 1143. The impedance matching may be performed by adjusting capacitance of the cap. bank 1143.

The controller 1145 may adjust the capacitance of the cap. bank 1143.

The controller 1145 may include a sensor 1149, a digital controller, 1146, and an analog controller 1147.

The sensor 1149 receives the transmission power transmitted by the transmitting antenna 1150 as the wireless power to sense the power characteristic of the transmission power.

The digital controller 1146 may generate the digital control signal based on the power characteristic of the transmission power. The digital control signal may be an on/off signal of at least 1 bit or more. The digital control signal as a signal to open/close a switch of the cap. bank 1143 may have bits as many as switches. As the switch is opened/closed, a connection of the capacitor is adjusted, and as a result, the capacitance of the cap. bank 1143 may be digitally controlled.

Further, the digital controller 1146 may generate an analog control start signal for activating the analog controller 1147 when the digital control of the switch of the cap. bank 1143 is completed.

The analog controller 1147 receives the analog control start signal to be activated by the received analog control start signal. The analog controller 1137 may generate an analog control signal based on the power characteristic of the transmission power. As a result, capacitance of a variable capacitor of the cap. bank 1143 may be adjusted. For example, the variable capacitor may be a varactor of which capacitance is changed according to a magnitude of the analog control signal.

Although each of the amplifier 1130 and the impedance matcher 1140 has been described above, the amplifier 1130 and the impedance matcher 1140 may be simultaneously provided to the wireless power transmitting apparatus 1100.

Figure 6:
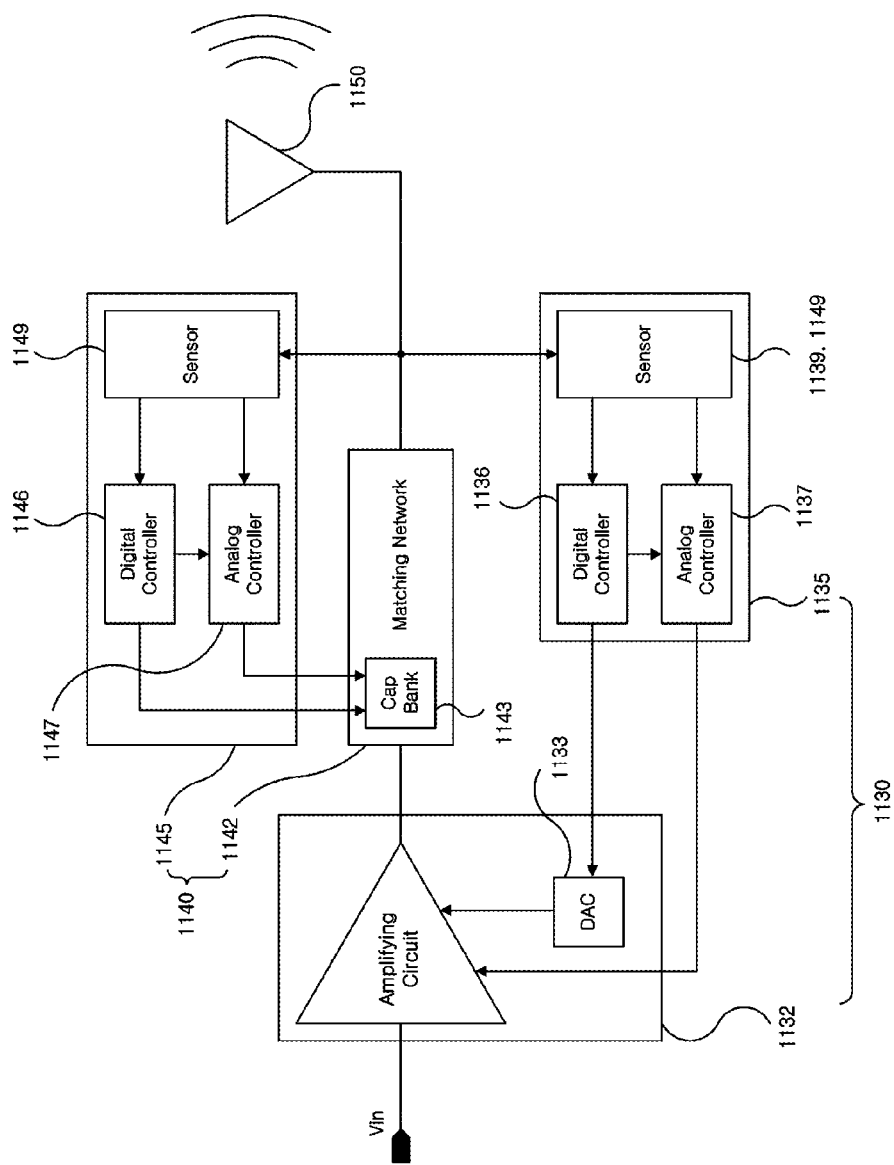
FIG. 6 is a block diagram of first forms of the amplifier and the impedance matcher according to the exemplary embodiment of the present invention.
Figure 7:
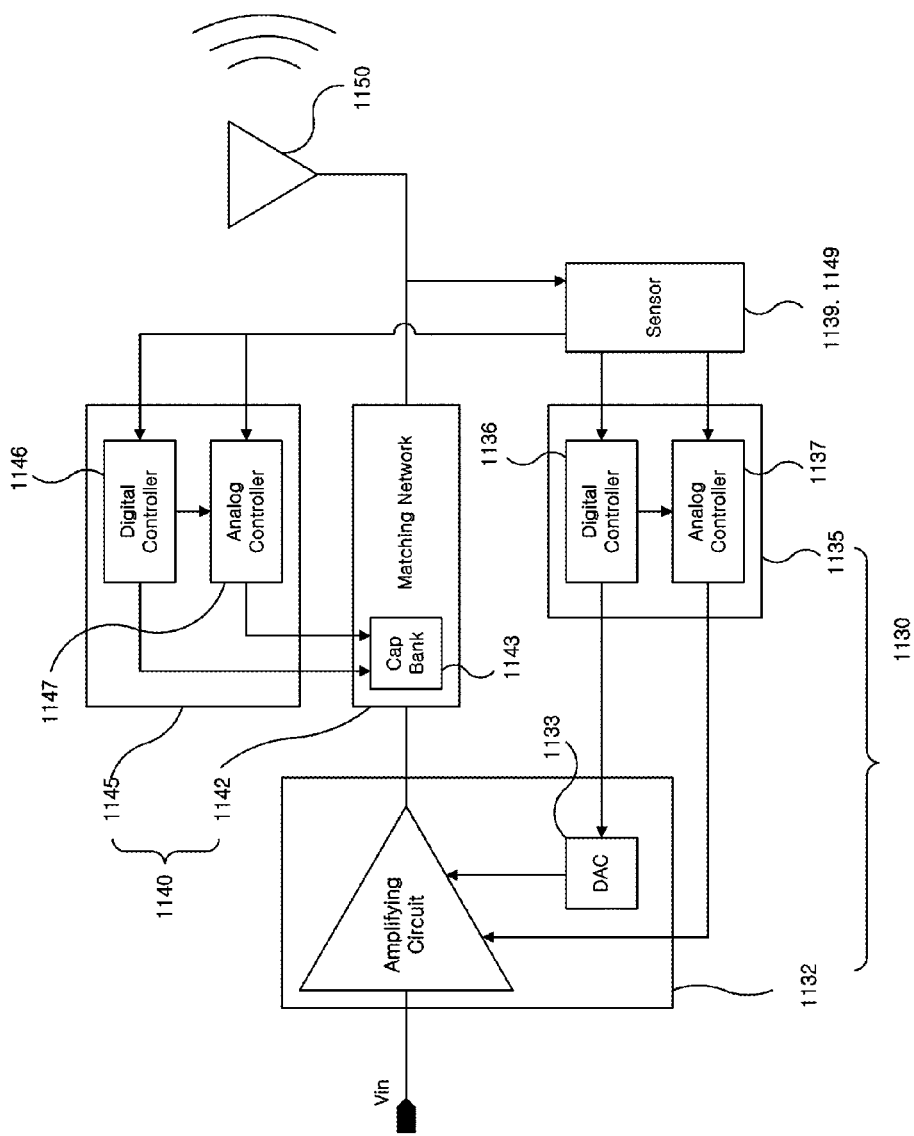
FIG. 7 is a block diagram of second forms of the amplifier and the impedance matcher according to the exemplary embodiment of the present invention.
Figure 8:
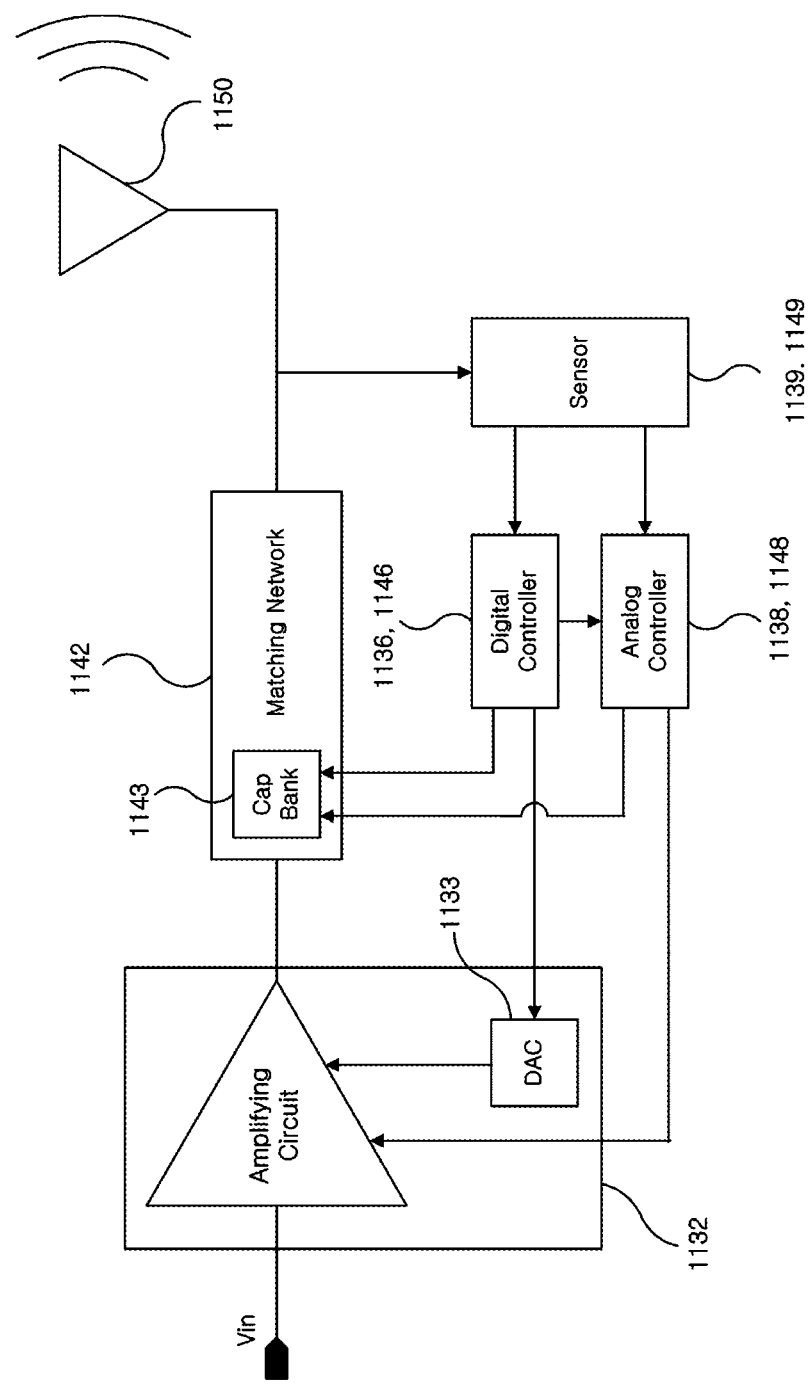
FIG. 8 is a block diagram of third forms of the amplifier and the impedance matcher according to the exemplary embodiment of the present invention.

FIGS. 6 to 8 are diagrams illustrating various forms of the amplifier 1130 and the impedance matcher 1140 according to the embodiment of the present invention.

FIG. 6 is a block diagram of first forms of the amplifier 1130 and the impedance matcher 1140 according to the embodiment of the present invention.

For example, each of the amplifier 1130 and the impedance matcher 1140 may be separately provided to the wireless power transmitting apparatus 1100, as illustrated in FIG. 6.

FIG. 7 is a block diagram of second forms of the amplifier 1130 and the impedance matcher 1140 according to the embodiment of the present invention.

As another example, the amplifier 1130 and the impedance matcher 1140 may be provided in the wireless power transmitting apparatus 1100 to share the sensors 1139 and 1149, as illustrated in FIG. 7. The amplifying circuit 1132 of the amplifier 1130 and the matching network 1142 of the impedance matcher 1140 are separately provided and further, the digital controller 1136 and the analog controller 1137 of the amplifier 1130 and the digital controller 1146 and the analog controller 1147 of the impedance matcher 1140 may be separately provided. On the contrary, the amplifier 1130 and the impedance matcher 1140 may share the sensors 1139 and 1149.

Herein, the sensors 1139 and 1149 sense the power characteristic of the transmission power and the sensed power characteristic may be transmitted to the controller 1135 of the amplifier 1130 and the controller 1145 of the impedance matcher 1140. The controllers 1135 and 1145 separately operate based on sensing results of the sensors 1139 and 1149, respectively.

FIG. 8 is a block diagram of third forms of the amplifier 1130 and the impedance matcher 1140 according to the embodiment of the present invention.

As yet another example, the amplifier 1135 and the impedance matcher 1140 may be provided in the wireless power transmitting apparatus 1100 to share the controllers 1135 and 1145, as illustrated in FIG. 8. In this case, each of the amplifying circuit 1132 and the matching network 1142 are separately provided, and the sensors 1139 and 1149, the digital controllers 1136 and 1146, and the analog controllers 1137 and 1147 may be shared. The digital controllers 1136 and 1146 and the analog controllers 1137 and 1147 generate control signals based on the sensing results of the sensors 1139 and 1149 and the generate control signals are transferred to the amplifying circuit 1132 and the matching network 1142, respectively. The amplification ratio of the amplifying circuit 1132 may be adjusted according to the control signals. The capacitance of the matching network 1142 may also be adjusted according to the control signals.

Hereinafter, a circuit constitution of the amplifier 1130 and the impedance matcher 1140 will be described.

Figure 9:
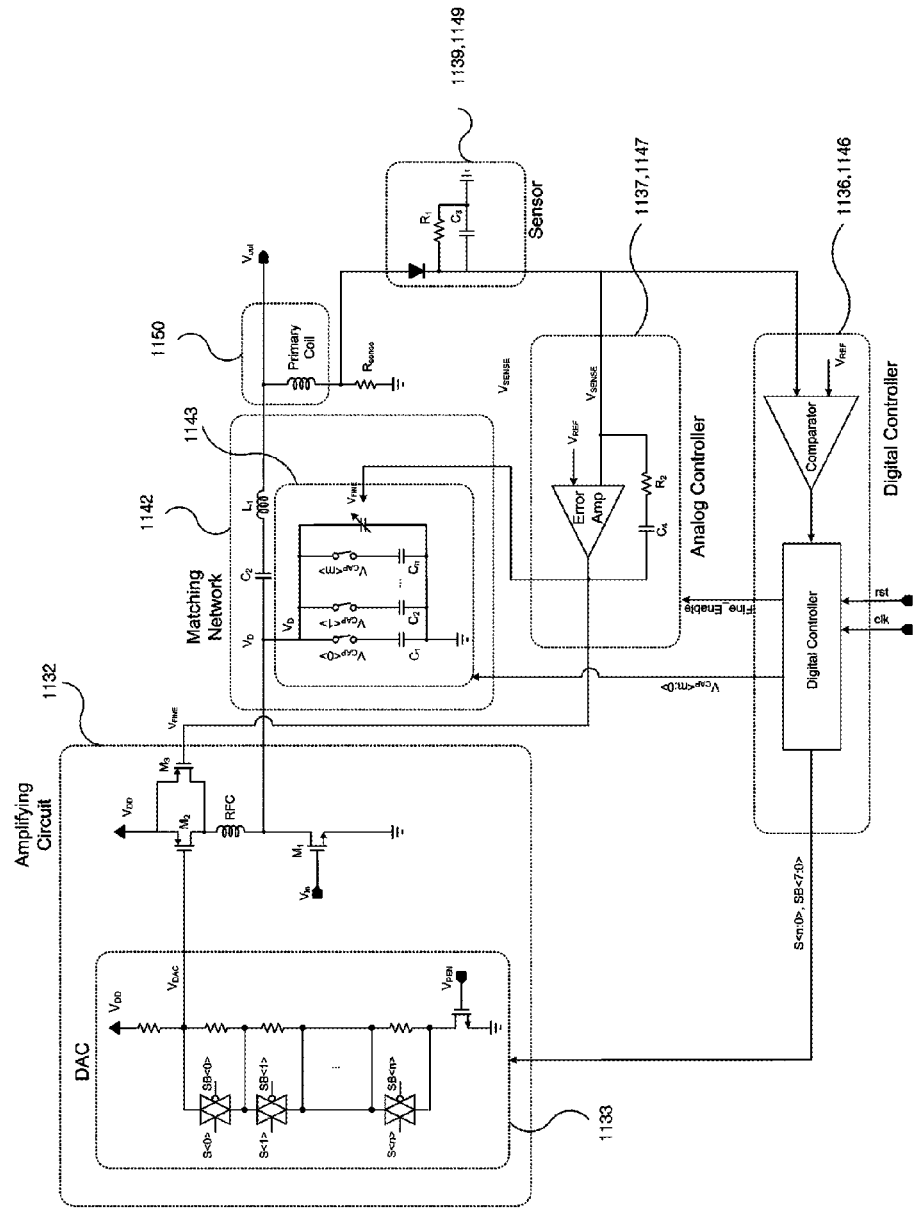
FIG. 9 is a circuit diagram of the third forms of the amplifier and the impedance matcher according to the exemplary embodiment of the present invention.

FIG. 9 is a circuit diagram of the third forms of the amplifier 1130 and the impedance matcher 1140 according to the embodiment of the present invention. The amplifier 1130 and the impedance matcher 1140 may be implemented in various forms including the forms illustrated in FIGS. 4 to 7. However, even when the amplifier 1130 and the impedance matcher 1140 are implemented in the forms of FIGS. 4 to 7, the amplifier 1130 and the impedance matcher 1140 operate in the same and similar manners even in the case in which the amplifier 1130 and the impedance matcher 1140 are implemented in the forms of FIGS. 8 and 9, and as a result, the forms illustrated in FIGS. 8 and 9 will be primarily described.

Referring to FIG. 9, the sensors 1139 and 1149 may receive the power wirelessly transmitted by the transmitting antenna 1150, that is, the transmission power. As a result, the sensors 139 and 1149 may measure the transmission characteristic including at least one of the current value or the voltage value of the transmission power. The sensors 1139 and 1149 may transmit a measured result to the digital controllers 1136 and 1146 or the analog controllers 1137 and 1147.

First, the digital controllers 1136 and 1146 may receive the power characteristic of the transmission power from the sensors 1139 and 1149. Further, the digital controllers 1136 and 1146 may receive a reference power characteristic, that is, a reference voltage value Vref or a reference current value Iref. Herein, the reference voltage value Vref or the reference current value Iref may mean a voltage value or a current value which the wireless power receiving apparatus 1200 intends to receive through transmitting the wireless power. The reference power characteristic may be received through the communication unit 1260 of the wireless power transmitting apparatus 1100 through the communication unit 1260 of the wireless power receiving apparatus 1200 and input into the digital controllers 1136 and 1146 from the main controller 1170 of the wireless power transmitting apparatus 1100.

The digital controllers 1136 and 1146 compare the power characteristic of the input transmission power and the reference power characteristic to generate the digital control signal. The digital control signal may be the on/off signal. For example, the digital controllers 1136 and 1146 as comparators may generate the on signal when the power characteristic of the transmission power is larger than the reference power characteristic and generate the off signal when the power characteristic of the transmission power is smaller than the reference power characteristic. The generated digital control signal may be transferred to the amplifying circuit 1132 and the matching network 1142.

The amplification ratio of the amplifying circuit 1132 may be digitally adjusted according to the digital control signal.

The amplifying circuit 1132 may include a first MOS M3 and a second MOS M2 in which a power value transferred from a source to a drain is adjusted according to power input into a gate.

The DA converter 1133 may receive the digital control signal. The DA converter 1133 may receive the digital control signal and output the received digital control signal as an analog signal. Herein, a level of the analog signal may be determined according to the digital control signal. In detail, the DA converter 1133 may include a plurality of switches that are switched according to the on/off signal and the level of the output analog signal may be determined according to an opening/closing state of the switch.

As such, when the DA converter 1133 includes the plurality of switches, the digital controllers 1136 and 1146 may generate a digital control signal having the number of bits corresponding to the number of switches. The respective switches of the DA converter 1133 may be switched according to a corresponding bit being the on signal or the off signal.

Alternatively, when the DA converter 1133 includes the plurality of switches, the digital controllers 1136 and 1146 may repeatedly generate a 1-bit digital control signal at the number of times corresponding to the number of switches. As a result, opening/closing states of the plurality of switches may be sequentially determined. For example, closing/opening of a first switch is controlled by a digital control signal transmitted first and opening/closing of a second switch may be controlled by a digital control signal transmitted next thereto.

Meanwhile, the digital controllers 1136 and 1146 may determine that the digital control is completed when the number of generation times of the digital control signal is repeated as many as the switches and generate the analog control start signal.

A gate of the first MOS M3 is connected to an output terminal of the DA converter 1133. Further, power is applied to a source of the first MOS m3 from the outside. As a result, a magnitude of power output to a drain of the first MOS M3 may be adjusted according to a magnitude of the analog signal output from the DA converter 1133.

Consequently, the level of the analog signal of the DA converter 1133 may be determined according to the digital control signals of the digital controllers 1136 and 1146 and the amplification ratio of the amplifier 1130 may be digitally adjusted as a magnitude of the power output to the drain of the first MOS M3 is determined according to the level of the analog signal.

The capacitance of the matching network 1142 may be digitally adjusted according to the digital control signal.

The matching network 1142 may include a cap. bank 1143. The cap. bank 1143 may include a plurality of capacitors that has fixed capacitance, a plurality of switches that adjusts opening/closing of the capacitors, and a variable capacitor of which capacitance is variably adjusted.

The cap. bank 1143 may receive the digital control signal. A switch that adjusts opening/closing a plurality of fixed capacitors may be switched by the digital control signal. As a result, connection states of the plurality of capacitors are controlled so as to digitally adjust the capacitance of the cap. bank 1143.

As such, when the cap. bank 1143 includes the plurality of switches, the digital controllers 1136 and 1146 may generate a digital control signal having the number of bits corresponding to the number of switches. The respective switches of the cap. bank 1143 may be switched according to a corresponding bit being the on signal or the off signal.

Alternatively, when the cap. bank 1143 includes the plurality of switches, the digital controllers 1136 and 1146 may repeatedly generate a 1-bit digital control signal at the number of times corresponding to the number of switches. As a result, opening/closing states of the plurality of switches may be sequentially determined. For example, closing/opening of a first switch is controlled by a digital control signal transmitted first and opening/closing of a second switch may be controlled by a digital control signal transmitted next thereto. Meanwhile, the digital controllers 1136 and 1146 may determine that the digital control is completed when the number of generation times of the digital control signal is repeated as many as the switches and generate the analog control start signal.

When the digital control is ended through the above process, the analog control may be started. Herein, the digital controllers 1136 and 1146 may determine that the digital control is ended when a difference between the power characteristic of the transmission power and the reference power characteristic is smaller than a predetermined value or the power characteristic of the transmission power is smaller or larger than the reference power characteristic, and generate the analog control start signal. Of course, the digital controllers 1136 and 1146 may determine that the digital control is ended according to the number of repeated generation times of the digital control signal as described above. Of course, herein, the digital control of the amplifying circuit 1132 and the digital control of the matching network 1142 need not particularly be ended simultaneously and when any one is first ended, the first ended part first enters the analog control and other parts may be even digitally controlled and thereafter, enter the analog control.

Meanwhile, the digital controllers 1136 and 1146 may start the digital control in the case where a condition of the end of the digital control is cancelled even after the digital control is ended. For example, when the digital control is ended according to a condition in which the power characteristic of the transmission power is smaller than the reference power characteristic, the digital control may be resumed under a condition in which the reference power characteristic is larger than the power characteristic of the transmission power. Alternatively, when a difference between the power characteristic of the transmission power and the reference power characteristic is larger than a predetermined value, the digital control may be resumed. Alternatively, the digital control may be periodically resumed.

When the analog controllers 1137 and 1147 receive the analog control start signal, the analog controllers 1137 and 1147 may be activated. The analog controllers 1137 and 1147 may receive the transmission characteristic of the transmission power and the reference power characteristic in a similar manner as the digital controllers 1136 and 1146. The digital controllers 1137 and 1147 may generate the analog control signal according to a difference in magnitude between the characteristic of the input transmission power and the reference power characteristic. For example, the analog controllers 1137 and 1147 may generate the analog control signal based on a difference between the voltage value of the transmission power and the reference voltage value Vref.

The amplification ratio of the amplifying circuit 1132 may be analoguely adjusted according to the analog control signal.

The amplifying circuit 1132 may include the second MOS M2 as described above. A gate of the second MOS M2 is connected to output terminals of the analog controllers 1137 and 1147. Further, power is applied to a source of the second MOS M2 from the outside. As a result, a magnitude of power output to a drain of the second MOS M2 may be adjusted according to a magnitude of the analog control.

Consequently, as the magnitude of the power output to the drain of the second MOS M2 is determined according to the levels of the analog control signals of the analog controllers 1137 and 1147, the amplification ratio of the amplifier 1130 may be digitally adjusted.

The capacitance of the matching network 1142 may be analoguely adjusted according to the analog control signal.

As described above, the cap. bank 1143 of the matching network 1142 may include a variable capacitor of which capacitance is variably adjusted. The variable capacitor may be a varactor of which capacitance is adjusted according to the input voltage value. The analog control signal may be input into the varactor and the capacitance of the varactor may be analoguely adjusted according to the level of the analog control signal. As a result, the capacitance of the impedance matcher 1140 may be analoguely adjusted.

Hereinafter, a method for transmitting wireless power according to an embodiment of the present invention will be described. The method for transmitting wireless power will be described with reference to the wireless power transmitting system 1000 according to the embodiment of the present invention. Of course, a method for receiving wireless power may not be performed only by the wireless power transmitting system 1000 and may be performed by other system which is similar as or the same as the wireless power transmitting system 1000.

Figure 10:
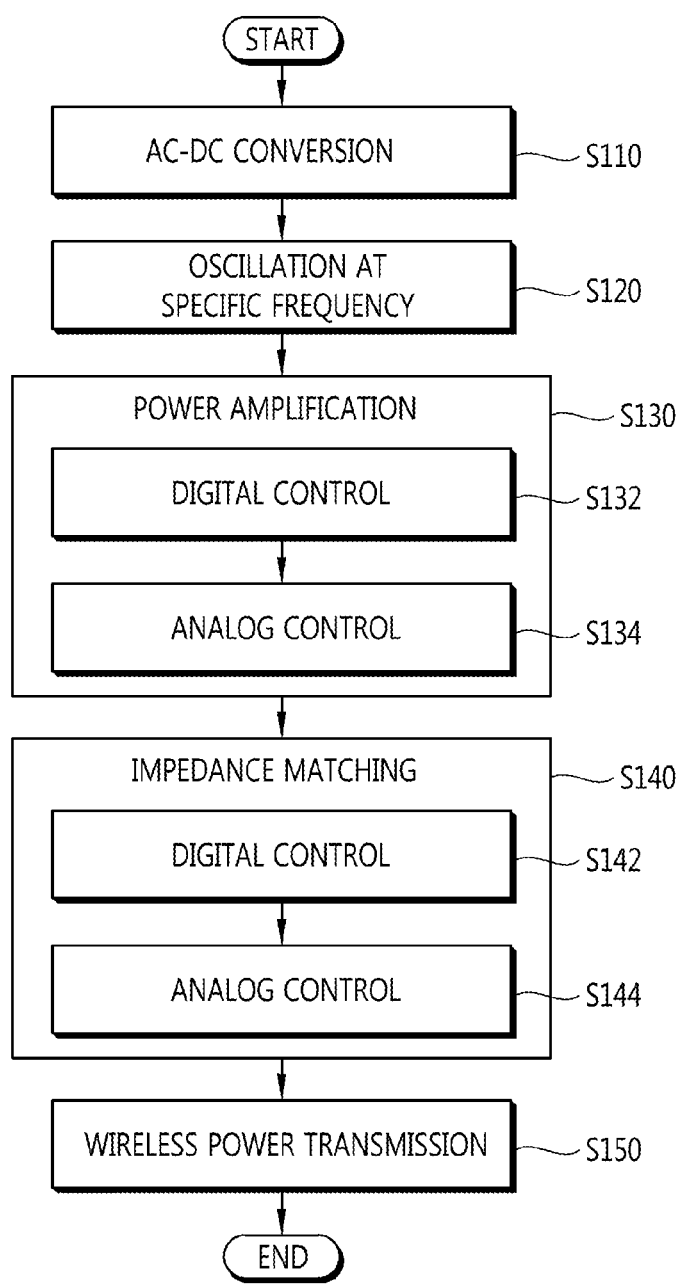
FIG. 10 is a flowchart of a method for transmitting wireless power according to an exemplary embodiment of the present invention.

FIG. 10 is a flowchart of a method for transmitting wireless power according to an embodiment of the present invention.

Referring to FIG. 10, the method for transmitting wireless power may include rectifying external power to a DC waveform (S110), oscillating the rectified power at a specific frequency (S120), amplifying power (S130), matching impedance (S140), and transmitting power wirelessly (S150). Herein, the amplifying the power may include digitally controlling an amplification ratio (S132) and analoguely controlling the amplification ratio (S134). Further, the matching of the impedance may include digitally controlling capacitance (S142) and analoguely controlling the capacitance (S144).

Hereinafter, the aforementioned respective steps will be described in more detail.

First, when power is applied to a wireless power transmitting apparatus 1100 from the outside, an AC-DC converter 1110 may rectify the applied power to a DC waveform (S110). The oscillator 1120 may oscillate the rectified power at the specific frequency (S120). The oscillated power having the specific frequency is input into an amplifier 1130. The amplifier 1130 may output transmission power by amplifying the power having the specific frequency (S130). In this case, an amplification ratio of the amplifier 1130 is first digitally controlled by a digital controller 1136 (S132) and when a digital control is ended, the amplification ratio may be analoguely controlled by an analog controller 1137 (S134). An impedance matcher 1140 may match the impedance of the wireless power transmitting apparatus 1100. In this case, capacitance of the impedance matcher 1140 is first digitally controlled by the digital controller 1146 (S142) and when a digital control is ended, the capacitance may be analoguely controlled by the analog controller 1147 (S144). A transmitting antenna 1150 receives transmission power to radiate a magnetic field by using the applied transmission power. As a result, the wireless power transmission may be performed.

Hereinafter, an operation method of the amplifier 1130 in the method for transmitting wireless power according to an embodiment of the present invention will be described.

Figure 11:
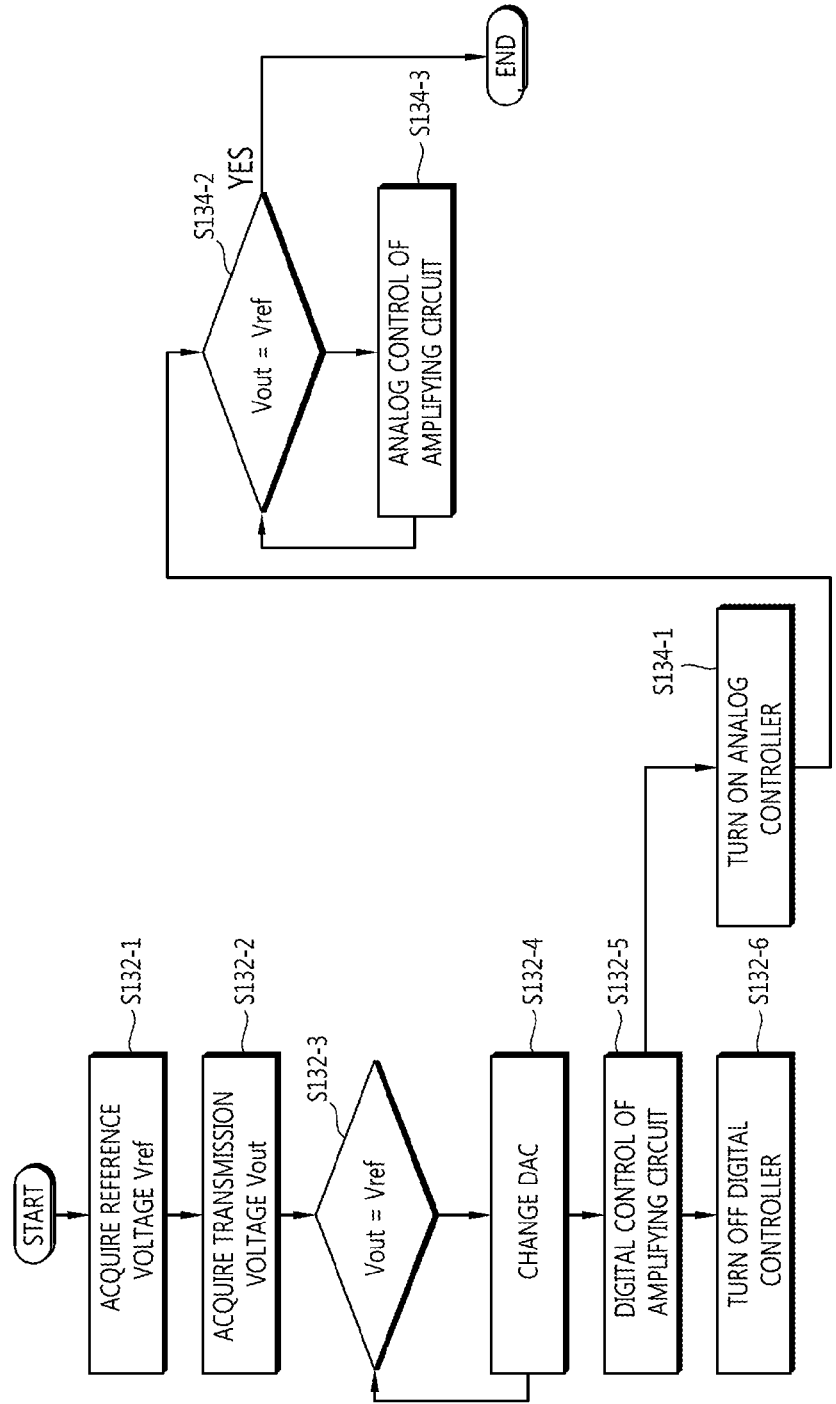
FIG. 11 is an operational flowchart in the method for transmitting wireless power according to an exemplary embodiment of the present invention.

FIG. 11 is a flowchart of an operation of the amplifier 1130 in the method for transmitting wireless power according to the embodiment of the present invention.

Referring to FIG. 11, the operation method of the amplifier 1130 may include acquiring a reference voltage value Vref (S132-1), acquiring a voltage value Vout of transmission power (S132-2), outputting a digital control signal by comparing the reference voltage value Vref and the voltage value Vout of the transmission power (S132-3), outputting, a DA converter 1133, an analog signal according to the digital control signal (S132-4), digitally controlling an amplification ratio according to the analog signal (S132-6), deactivating a digital controller 1136 when the digital control is ended (S132-7), activating an analog controller 1137 (S134-1), outputting, the analog controller 1137, an analog control signal based on a difference between the reference voltage value Vref and the output voltage Vout of the transmission power (S134-2), and analoguely controlling an amplification ratio of an amplifying circuit 1132 according to the analog control signal (S134-3).

Hereinafter, the aforementioned respective steps will be described in detail with reference to FIGS. 12 to 14.

First, the reference voltage value Vref may be acquired (S132-1). The reference voltage value Vref may be a predetermined value. Alternatively, a main controller 1170 may receive the reference voltage value Vref from a wireless power receiving apparatus 1200 through a communication unit 1160. The reference voltage value Vref may be received in preparing for the wireless power transmission or periodically received during the wireless power transmission. Alternatively, the main controller 1170 may receive a device profile from the wireless power receiving apparatus 1200 in preparing for the wireless power transmission through the communication unit 1160 and determines the reference voltage value Vref according to the received device profile.

A sensor 1139 may acquire the voltage value Vout of the transmission power (S132-2). The sensor 1139 may receive the transmission power and sense the voltage value Vout of the transmission power by using the received transmission power.

Figure 12:
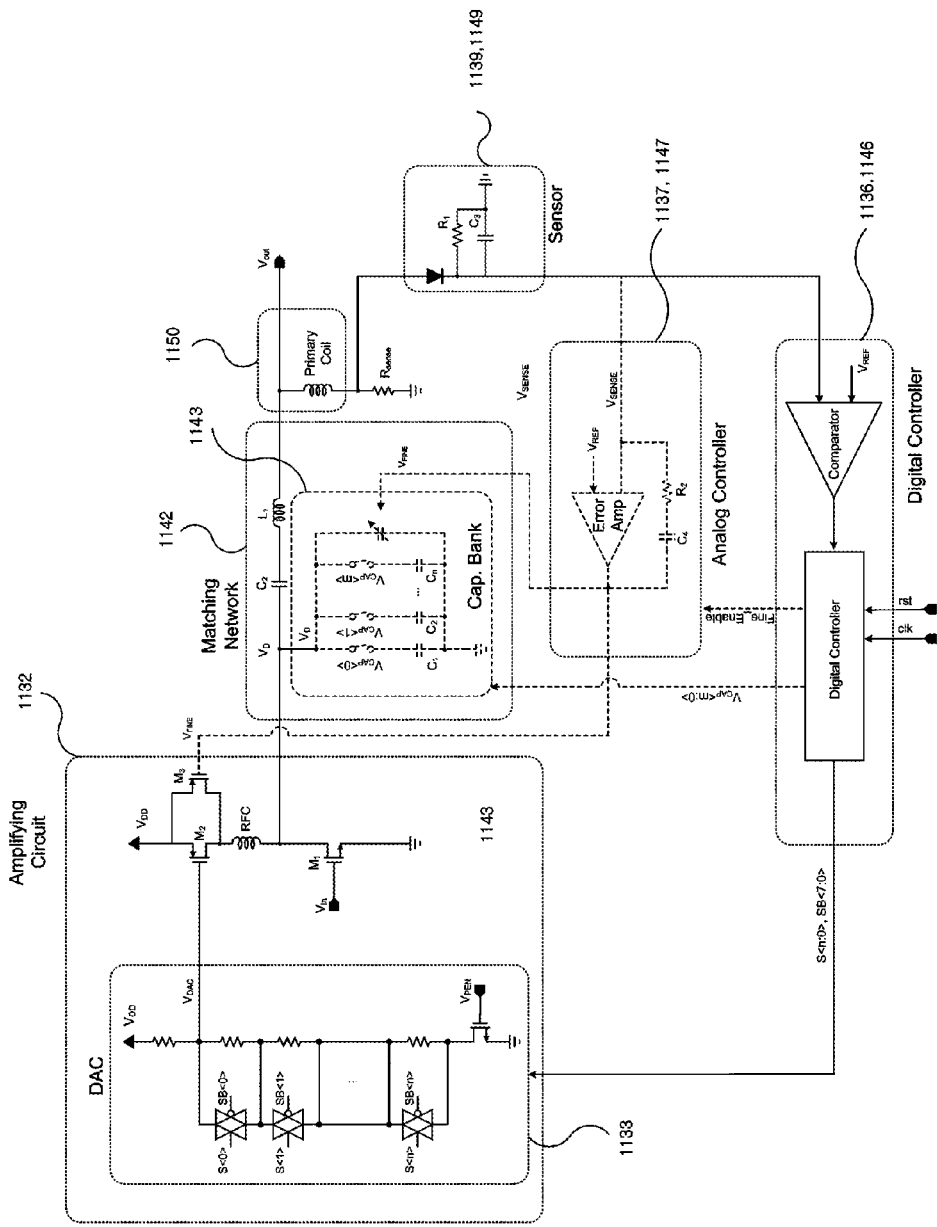
FIG. 12 is a diagram illustrating a digital control operation of an amplifier according to the exemplary embodiment of the present invention.

FIG. 12 is a diagram illustrating a digital control operation of the amplifier 1130 according to the embodiment of the present invention.

Referring to FIG. 12, the digital controller 1136 may output the digital control signal by comparing the reference voltage value Vref and the voltage value Vout of the transmission power (S132-3). For example, when the voltage value Vout of the transmission power is smaller than the reference voltage value Vref, an on signal may be generated and when the voltage value Vout of the transmission power is larger than the reference voltage value Vref, an off signal may be generated. Alternatively, to the contrary, when the voltage value Vout of the transmission power is larger than the reference voltage value Vref, the on signal may be generated and when the voltage value Vout of the transmission power is smaller than the reference voltage value Vref, the off signal may be generated.

The DA converter 1133 may output the analog signal according to the digital control signal (S132-4). As a switch of the DA converter 1133 is switched according to the digital control signal, a level of the analog signal output from the DA converter 1133 may be adjusted. Switching the switch of the DA converter 1133 may be controlled sequentially one by one by a 1-bit on/off signal at plural times or controlled by an on/off signal of bits corresponding to the number of switches.

The amplification ratio of the amplifying circuit 1132 may be digitally controlled according to the analog signal (S132-6). In detail, a magnitude of power output to a drain is adjusted according to a level of an analog signal input into a gate of a first MOS M1, and as a result, the amplification ratio may be digitally controlled. When the digital control is ended, the digital controller 1136 is deactivated (S132-7).

Figure 13:
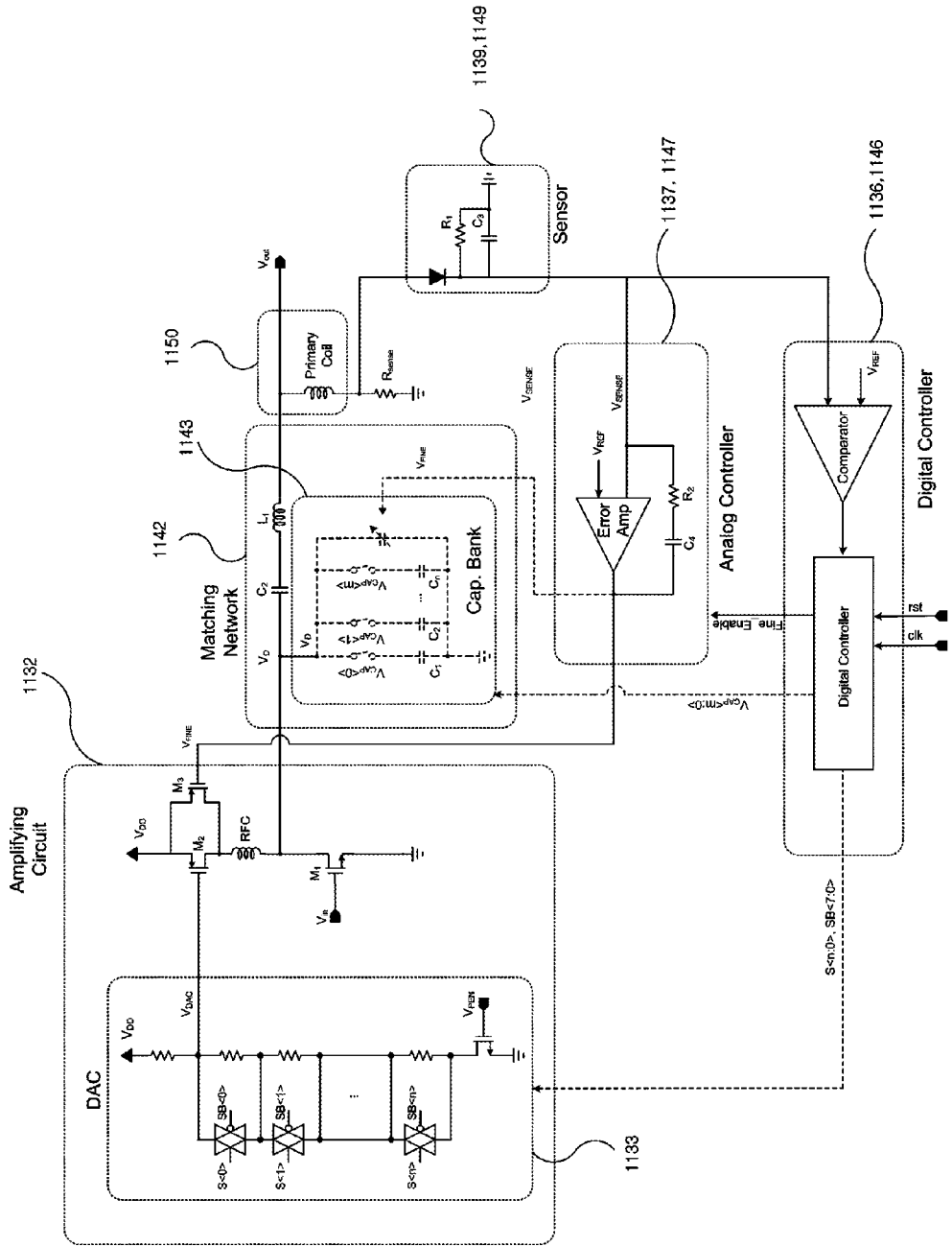
FIG. 13 is a diagram illustrating an analog control operation of the amplifier according to the exemplary embodiment of the present invention.

FIG. 13 is a view illustrating an analog control operation of the amplifier 1130 according to the embodiment of the present invention.

Referring to FIG. 13, when the digital control is ended, the digital controller 1136 transmits an analog control start signal to the analog controller 1137, and as a result, the analog controller 1137 is activated (S134-1).

The analog controller 1137 may output the analog control signal based on the difference between the reference voltage value Vref and the voltage value Vout of the transmission power (S134-2).

The amplification ratio of the amplifying circuit 1132 may be analoguely controlled according to the analog control signal (S134-3). In detail, a magnitude of power output to a drain is adjusted according to a level of an analog control signal input into a gate of a second MOS M2, and as a result, the amplification ratio may be analoguely controlled.

Figure 14:
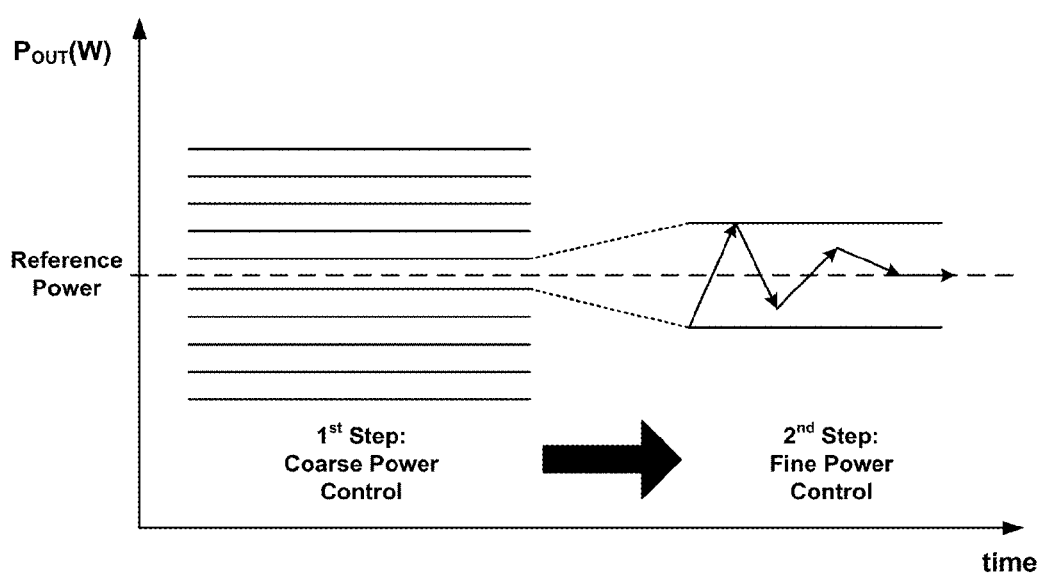
FIG. 14 is a graph of transmission power by the operation of the amplifier according to the exemplary embodiment of the present invention.

FIG. 14 is a graph of transmission power by an operation of the amplifier 1130 according to the embodiment of the present invention.

Referring to FIG. 14, the transmission power output from the amplifier 1130 may be adjusted by any one of primarily determined steps. Such a digital control process may be performed as the digital controller 1136 controls a switching state of the DA converter 1133 as described above. When the digital control is ended, the transmission power output from the amplifier 1130 may be secondarily analoguely controlled according to a difference between a desired power value and a current transmission power value.

Hereinafter, an operation method of the impedance matcher 1140 in the method for transmitting wireless power according to an embodiment of the present invention will be described.

Figure 15:
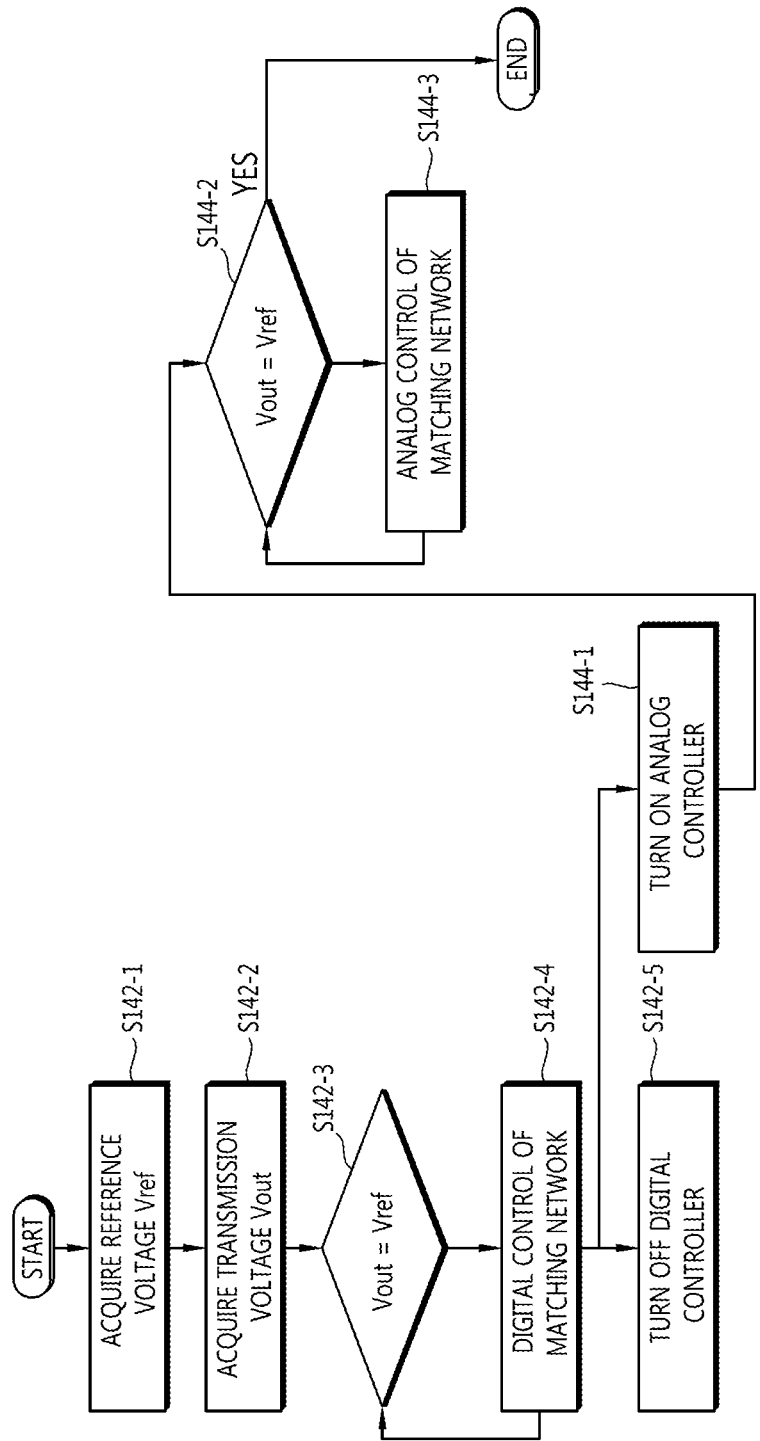
FIG. 15 is an operational flowchart of an impedance matcher in the method for transmitting wireless power according to the exemplary embodiment of the present invention.

FIG. 15 is a flowchart of an operation of the impedance matcher 1140 in the method for transmitting wireless power according to the embodiment of the present invention.

Referring to FIG. 15, the operation method of the impedance matcher 1140 may include acquiring a reference voltage value Vref (S142-1), acquiring a voltage value Vout of transmission power (S142-2), outputting a digital control signal by comparing the reference voltage value and the voltage value Vout of the transmission power (S142-3), outputting, a DA converter 1133, an analog signal according to the digital control signal (S142-4), digitally controlling an amplification ratio according to the analog signal (S142-6), deactivating a digital controller 1146 when the digital control is ended (S142-7), activating an analog controller 1147 (S144-1), outputting, the analog controller 1147, an analog control signal based on a difference between the reference voltage value Vref and the output voltage Vout of the transmission power (S144-2), and analoguely controlling an amplification ratio of an amplifying circuit 1142 according to the analog control signal (S144-3).

Hereinafter, the aforementioned respective steps will be described in detail with reference to FIGS. 16 to 18.

First, the reference voltage value Vref may be acquired (S142-1). The reference voltage value Vref may be a predetermined value. Alternatively, a main controller 1170 may receive the reference voltage value Vref from a wireless power receiving apparatus 1200 through a communication unit 1160. The reference voltage value Vref may be received in preparing for the wireless power transmission or periodically received during the wireless power transmission. Alternatively, the main controller 1170 may receive a device profile from the wireless power receiving apparatus 1200 in preparing for the wireless power transmission through the communication unit 1160 and determines the reference voltage value Vref according to the received device profile.

A sensor 1149 may acquire the voltage value Vout of the transmission power (S142-2). The sensor 1149 may receive the transmission power and sense the voltage value Vout of the transmission power by using the received transmission power.

Figure 16:
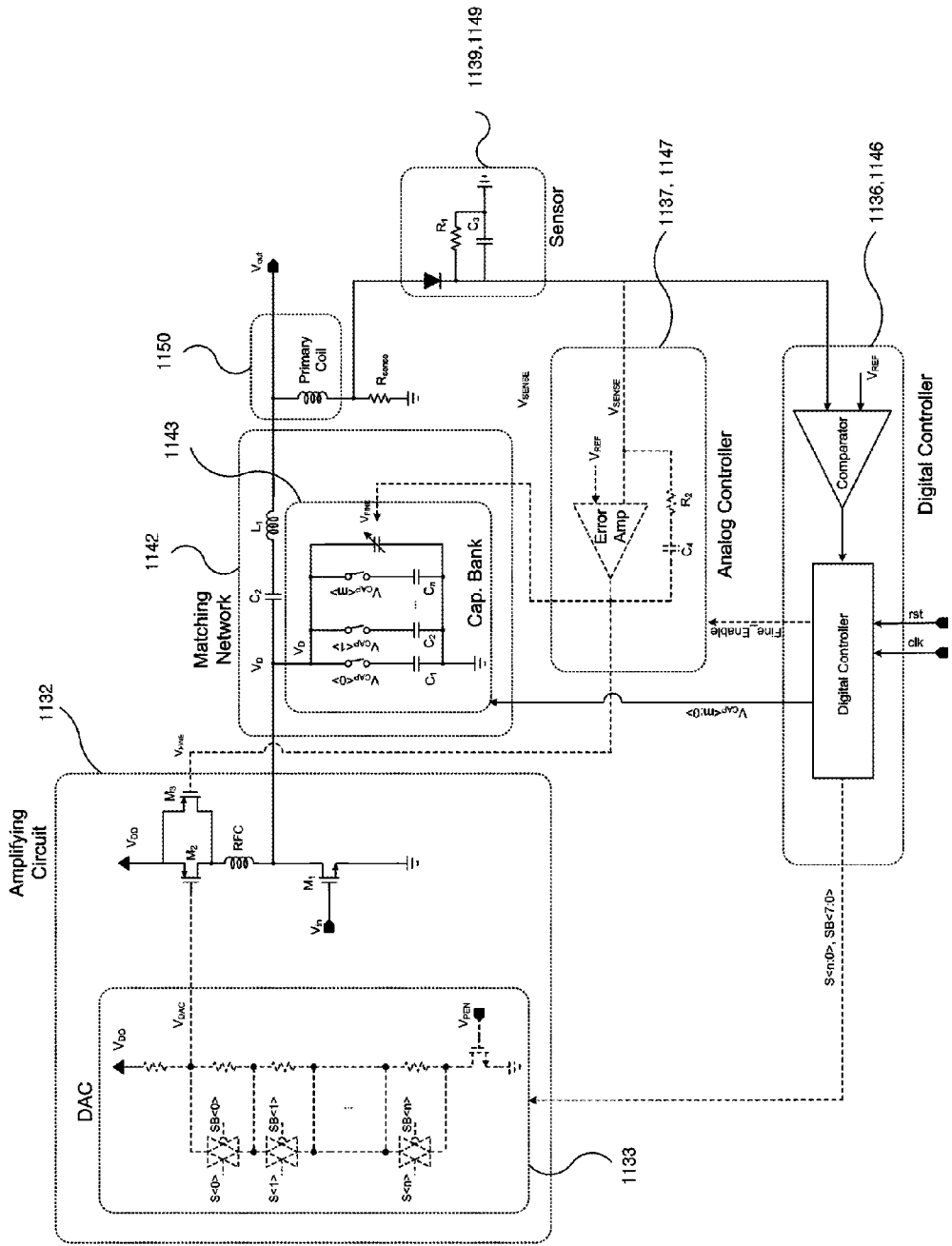
FIG. 16 is a diagram illustrating a digital control operation of the impedance matcher according to the exemplary embodiment of the present invention.

FIG. 16 is a diagram illustrating a digital control operation of the impedance matcher 1140 according to the embodiment of the present invention.

Referring to FIG. 16, the digital controller 1146 may output the digital control signal by comparing the reference voltage value Vref and the voltage value Vout of the transmission power (S142-3). For example, when the voltage value Vout of the transmission power is smaller than the reference voltage value Vref, an on signal may be generated and when the voltage value Vout of the transmission power is larger than the reference voltage value Vref, an off signal may be generated. Alternatively, to the contrary, when the voltage value Vout of the transmission power is larger than the reference voltage value Vref, the on signal may be generated and when the voltage value Vout of the transmission power is smaller than the reference voltage value Vref, the off signal may be generated.

The capacitance of the matching network 1142 may be adjusted according to the digital control signal (S142-4). As the switch of the cap. bank 1143 is switched according to the digital control signal, connection states of a plurality of capacitors of which opening/closing is adjusted by the switch are controlled, and as a result, capacitance of the cap. bank 1143 may be adjusted. Switching the switch of the cap. bank 1143 may be controlled sequentially one by one by a 1-bit on/off signal at plural times or digitally controlled by an on/off signal of bits corresponding to the number of switches. When the digital control is ended, the digital controller 1146 is deactivated (S142-5).

Figure 17:
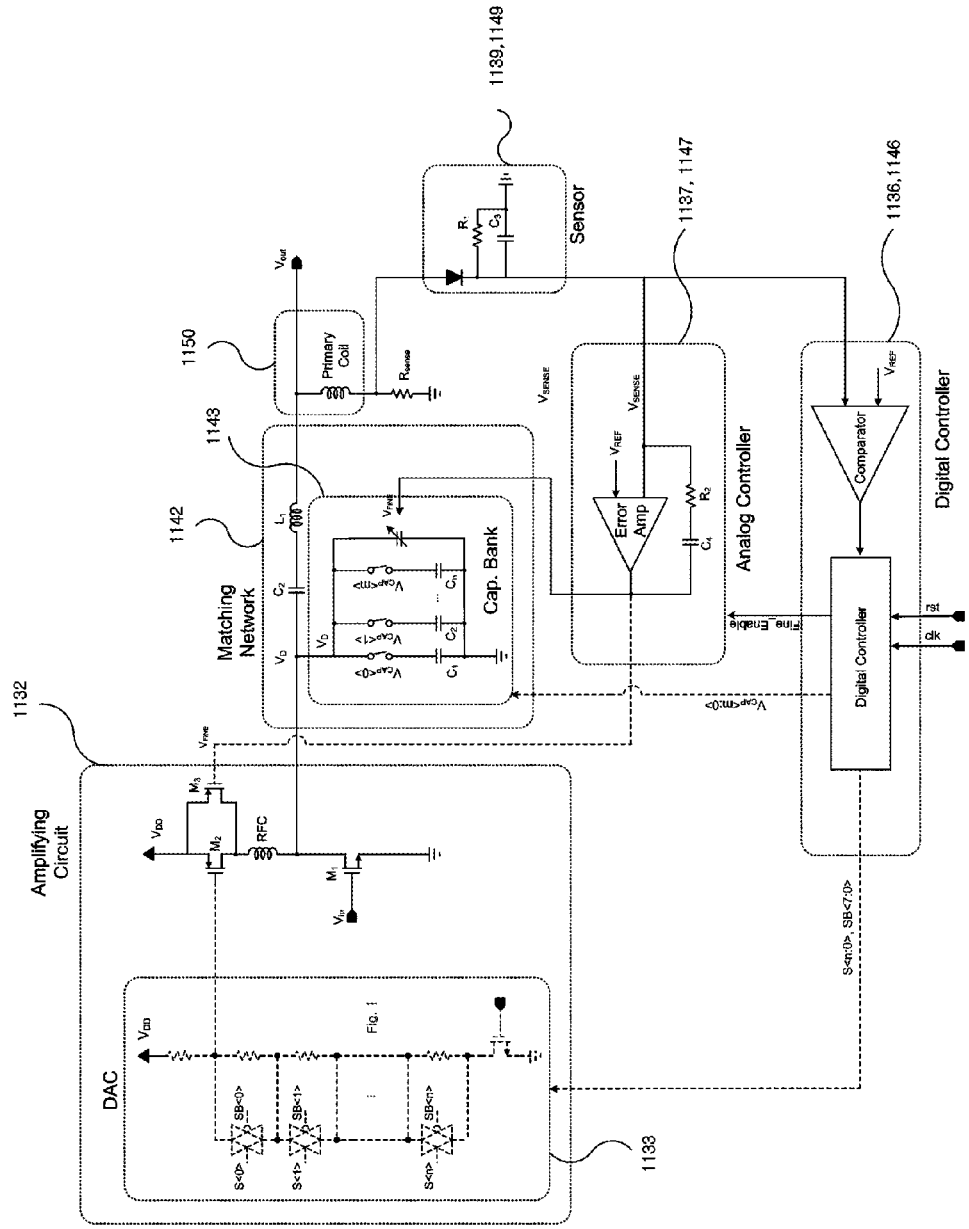
FIG. 17 is a diagram illustrating an analog control operation of the impedance matcher according to the exemplary embodiment of the present invention.

FIG. 17 is a diagram illustrating an analog control operation of the impedance matcher 1140 according to the embodiment of the present invention.

Referring to FIG. 17, when the digital control is ended, the digital controller 1146 transmits an analog control start signal to the analog controller 1147, and as a result, the analog controller 1147 is activated (S144-1).

The analog controller 1147 may output the analog control signal based on the difference between the reference voltage value Vref and the voltage value Vout of the transmission power (S144-2).

The amplification ratio of the matching network 1142 may be analoguely controlled according to the analog control signal (S144-3). In detail, a variable capacitor of the cap. bank 1143 receives the analog control signal and the capacitance is changed according to the level of the analog control signal.

Figure 18:
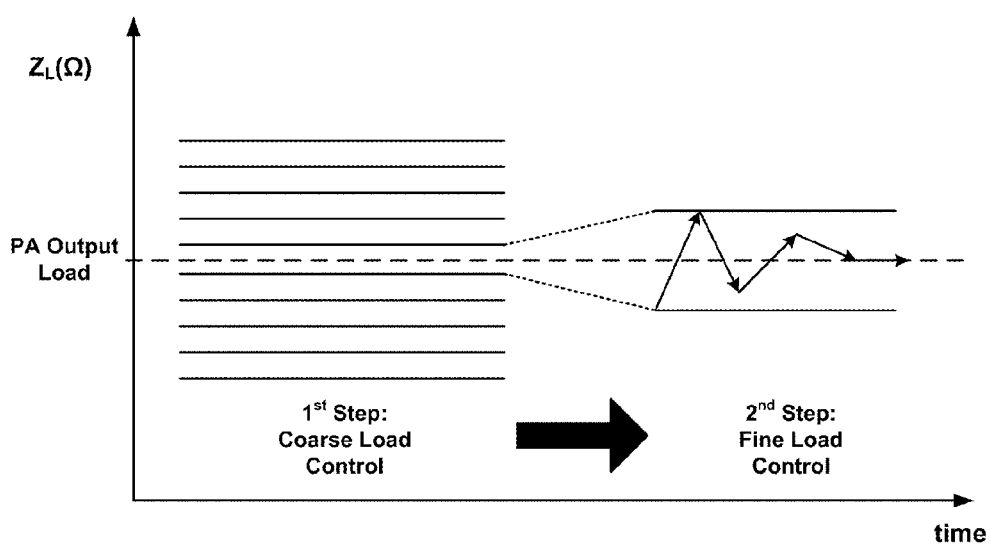
FIG. 18 is a graph of impedance by the operation of the impedance matcher according to the exemplary embodiment of the present invention.

FIG. 18 is a graph of impedance by an operation of the impedance matcher 1140 according to the embodiment of the present invention.

Referring to FIG. 18, the impedance of the impedance matcher 1140 may be adjusted by any one of primarily determined steps. Such a digital control process may be performed as the digital controller 1136 controls a switching state of a switch of the cap. bank 1143 as described above. When the digital control is ended, the impedance of the impedance matcher 1140 may be secondarily analoguely controlled according to a difference between desired impedance and current impedance.

Although it has been described above that the digital control and the analog control are performed based on the voltage value, the digital control and the analog control may be performed based on the current value instead of the voltage value.

Since all steps are required in the method for receiving wireless power according to the embodiment of the present invention, the method for receiving wireless power may be performed by some or all of the aforementioned steps. Further, the embodiments of the method for transmitting wireless power may be performed through combinations thereof. In addition, the aforementioned respective steps need not particularly be performed according to the described order and a step described later may be performed prior to a step described formerly.

Various exemplary embodiments of the present invention have been just exemplarily described, and various changes and modifications may be made by those skilled in the art to which the present invention pertains without departing from the scope and spirit of the present invention.

Accordingly, the various embodiments disclosed herein are not intended to limit the technical spirit but describe with the true scope and spirit being indicated by the following claims. The scope of the present invention may be interpreted by the appended claims and all the technical spirits in the equivalent range thereto are intended to be embraced by the claims of the present invention.

What is claimed is:

1. An apparatus for transmitting wireless power that performs wireless power transmission by using a magnetic field, the apparatus comprising:
an oscillator which oscillates power having a specific frequency;
an amplifier which outputs transmission power by amplifying the power having the specific frequency;
an impedance matcher including a matching network which adjusts impedance according to a digital control signal and an analog control signal, a sensor which senses a voltage value or a current value of the transmission power, a digital controller which compares a sensing result by the sensor to a magnitude of a reference value, outputs the digital control signal according to the comparison result, and generates an analog control start signal when adjustment of the impedance by the digital control signal is completed, and an analog controller which is activated by the analog control start signal and outputs the analog control signal based on a difference between the sensing result by the sensor and the reference value; and
a transmitting antenna which radiates the magnetic field by using the transmission power.

2. The apparatus of claim 1, further comprising:
a communication unit which communicates with a wireless power receiving apparatus that performs wireless power reception by using the magnetic field; and
a controller which receives the reference value from the wireless power receiving apparatus through the communication unit.

3. The apparatus of claim 1, further comprising:
a communication unit which communicates with a plurality of wireless power receiving apparatuses that performs the wireless power reception by using the magnetic field; and
a controller which receives a plurality of target values from the plurality of wireless power receiving apparatuses through the communication unit, respectively and calculates the reference value based on the plurality of target values.

4. The apparatus of claim 1, further comprising:
a communication unit which communicates with the wireless power receiving apparatus that performs the wireless power reception by using the magnetic field; and
a controller which receives a device profile from the wireless power receiving apparatus through the communication unit and determines the reference value based on the device profile.

5. The apparatus of claim 1, wherein:
the digital controller generates the analog control start signal when the difference between the sensing result and the reference value is equal to or less than a predetermined value.

6. The apparatus of claim 1, wherein:
the digital controller repeatedly outputs the digital control signal and generates the analog control start signal when the number of output times of the digital control signal reaches a predetermined number of times.

7. The apparatus of claim 1, wherein:
the digital controller outputs an on/off signal according to whether the sensing result is equal to or more than the reference value or is equal to or less than the reference value.

8. The apparatus of claim 1, wherein:
the matching network includes a plurality of fixed capacitors which are connected to each other in parallel, a plurality of switches which are connected to the plurality of fixed capacitors, respectively and control connection states of the plurality of capacitors according to the digital control signal, and a variable capacitor of which capacitance is changed according to the analog control signal.

9. The apparatus of claim 8, wherein:
the digital controller repeatedly outputs the digital control signals at the number of times corresponding to the number of the plurality of switches,
the plurality of switches are sequentially turned on/off according to the digital control signal, and
the digital controller outputs the analog control start signal when the output of the digital control signal is repeated at the number of times corresponding to the number of the plurality of switches.

10. The apparatus of claim 8, wherein:
the variable capacitor includes a varactor of which capacitance is adjusted according to a level of the analog control signal.

11. The apparatus of claim 1, wherein:
the amplifier incudes an amplifying circuit of which an amplification ratio is adjusted according to the digital control signal and the analog control signal.

12. The apparatus of claim 11, wherein:
the amplifying circuit includes a DA converter which outputs an analog signal according to the digital control signal, a first MOS which has a gate connected to an output terminal of the DA converter, and adjusts the amplification ratio according to the analog signal, and a second MOS which has a gate connected to an output terminal of the analog controller and adjusts the amplification ratio according to the analog control signal.

13. A method for transmitting wireless power by using a magnetic field, the method comprising:
oscillating, by an oscillator, power having a specific frequency;
outputting transmission power by amplifying the power having the specific frequency;
sensing, by a sensor, a voltage value or a current value of the transmission power;
comparing, by a digital controller, a sensing result by the sensor and a magnitude of a reference value and outputting a digital control signal according to the comparison result;
adjusting impedance according to the digital control signal;
generating, by the digital controller, an analog control start signal when the adjustment of the impedance by the digital control signal is completed;
outputting, by an analog controller, an analog control signal based on a difference between the sensing result by the sensor and the reference value when receiving the analog control start signal;
adjusting the impedance according to the analog control signal; and
radiating, by a transmitting antenna, the magnetic field by using the transmission power.

14. The method of claim 13, further comprising:
receiving the reference value from a wireless power receiving apparatus that performs wireless power reception by using the magnetic field.

15. The method of claim 13, further comprising:
receiving a plurality of target values from a plurality of wireless power receiving apparatuses that perform the wireless power reception by using the magnetic field, respectively; and
calculating the reference value based on the plurality of target values.

16. The method of claim 13, wherein:
receiving a device profile from the wireless power receiving apparatus that performs the wireless power reception by using the magnetic field; and
judging the reference value based on the device profile.

17. The method of claim 13, wherein:
in the generating of the analog control start signal, the analog control start signal is generated when the difference between the sensing result and the reference value is equal to or less than a predetermined value.

18. The method of claim 13, wherein:
the outputting of the digital control signal is repeatedly performed, and
in the generating of the analog control start signal, the analog control start signal is generated when the number of output times of the digital control signal reaches a predetermined number of times.

19. The method of claim 13, wherein:
in the outputting of the digital control signal, an on/off signal is output according to the sensing result being equal to or more than or equal to or less than the reference value.

20. The method of claim 13, wherein:
the adjusting of the impedance according to the digital control signal includes adjusting the impedance as connection states of a plurality of fixed capacitors connected to each other in parallel are adjusted according to the digital control signal, and
the adjusting of the impedance according to the analog control signal includes adjusting capacitance of a variable capacitor according to the analog control signal.

21. The method of claim 20, wherein:
the variable capacitor includes a varactor of which capacitance is adjusted according to a level of the analog control signal.

22. The method of claim 13, wherein:
the outputting of the transmission power includes adjusting an amplification ratio of the transmission power according to the digital control signal and the analog control signal.

23. The method of claim 22, wherein:
the adjusting of the amplification ratio includes outputting, by a DA converter, an analog signal according to the digital control signal, adjusting, by a first MOS having a gate connected to an output terminal of the DA converter, the amplification ratio according to the analog signal, and adjusting, by a second MOS receiving the analog control signal through a gate, the amplification ratio according to the analog control signal.

* * * * *